(12) United States Patent
Taylor et al.

(10) Patent No.: US 10,514,759 B2
(45) Date of Patent: Dec. 24, 2019

(54) DYNAMICALLY CONFIGURABLE INPUT STRUCTURE WITH TACTILE OVERLAY

(71) Applicant: Apple Inc., Cupertino, CA (US)

(72) Inventors: Steven J. Taylor, Cupertino, CA (US); Brigit E. Lamberson, Cupertino, CA (US); Gemma A. Roper, Cupertino, CA (US); Megan A. McClain, Cupertino, CA (US); Thomas S. Hulbert, Cupertino, CA (US); Benjamin G. Jackson, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 45 days.

(21) Appl. No.: 15/343,106

(22) Filed: Nov. 3, 2016

(65) Prior Publication Data

US 2018/0081437 A1    Mar. 22, 2018

Related U.S. Application Data

(60) Provisional application No. 62/397,533, filed on Sep. 21, 2016.

(51) Int. Cl.

| G06F 3/045 | (2006.01) |
| G06F 3/01 | (2006.01) |
| G06F 3/02 | (2006.01) |
| G06F 3/041 | (2006.01) |
| G06F 3/044 | (2006.01) |
| G06F 3/0488 | (2013.01) |

(52) U.S. Cl.
CPC .......... *G06F 3/016* (2013.01); *G06F 3/0202* (2013.01); *G06F 3/044* (2013.01); *G06F 3/0414* (2013.01); *G06F 3/04883* (2013.01); *G06F 2203/04105* (2013.01); *G06F 2203/04809* (2013.01)

(58) Field of Classification Search
CPC .......... H01H 13/14; G06F 2203/04105; G06F 2203/04809; G06F 3/016; G06F 3/0202; G06F 3/0414; G06F 3/044; G06F 3/04883; G06F 4/044
USPC .......................................... 345/168; 200/341
See application file for complete search history.

(56) References Cited

U.S. PATENT DOCUMENTS

| 5,695,859 A | 12/1997 | Burgess |
| 8,884,174 B2 | 11/2014 | Chou |
| 9,704,670 B2 | 7/2017 | Leong et al. |
| 9,847,193 B2 | 12/2017 | Liu et al. |

(Continued)

FOREIGN PATENT DOCUMENTS

WO    WO 2008/125130    10/2008

*Primary Examiner* — Insa Sadio
(74) *Attorney, Agent, or Firm* — Dorsey & Whitney LLP

(57) ABSTRACT

Embodiments are directed to an input device and methods related to the use thereof. The embodiment may include a deformable structure. The deformable structure may include a first layer defining an input surface and a second layer coupled to, and offset from, the first layer. At least one of the first layer or the second layer may define a geometric feature (e.g., including a protrusion, embossed portion, or other feature of one or both of the first and second layers). The geometric feature may be configured to collapse the deformable structure at a localized region in response to a force input. The embodiment may further include an input structure configured to produce an electrical response based on a magnitude of the force input.

21 Claims, 13 Drawing Sheets

(56) References Cited

U.S. PATENT DOCUMENTS

| | | |
|---|---|---|
| 2009/0267892 A1 | 10/2009 | Faubert |
| 2012/0092263 A1 | 4/2012 | Peterson et al. |
| 2012/0274599 A1 | 11/2012 | Shediwy |
| 2013/0044049 A1 | 2/2013 | Biggs et al. |
| 2013/0120265 A1 | 3/2013 | Horii et al. |
| 2013/0300590 A1* | 11/2013 | Dietz .................... G06F 9/4415 341/34 |
| 2014/0203953 A1 | 7/2014 | Moser et al. |
| 2014/0218303 A1* | 8/2014 | Kao ........................ G06F 3/016 345/168 |
| 2014/0318270 A1* | 10/2014 | Yoneyama ............. B25J 13/083 73/862.041 |
| 2016/0049265 A1* | 2/2016 | Bernstein ............... H01H 13/14 200/341 |

* cited by examiner

DYNAMICALLY CONFIGURABLE INPUT STRUCTURE WITH TACTILE OVERLAY

CROSS-REFERENCE TO RELATED APPLICATION(S)

This application is a nonprovisional patent application of and claims the benefit of U.S. Provisional Patent Application No. 62/397,533, filed Sep. 21, 2016 and titled "Dynamically Configurable Input Structure with Tactile Overlay," the disclosure of which is hereby incorporated herein by reference in its entirety.

FIELD

The described embodiments relate generally to a user input device. More particularly, the present embodiments relate to a user input device with a deformable tactile feedback structure incorporated therein.

BACKGROUND

In computing systems, a user input device may be employed to receive input from a user. Many traditional user input devices, such as keyboards, use mechanical support structures and switching mechanisms (e.g., scissor mechanisms, butterfly mechanisms, or the like), which limits the adaptability of the device. Other user input devices, such as touch screens, provide limited tactile feedback in response to a user input and/or a force input at the touch screen.

SUMMARY

Embodiments of the present invention are directed to a user input device having a deformable structure configured to provide tactile feedback to a user.

In a first aspect, the present disclosure includes a user input device. The user input device includes a deformable structure. The deformable structure includes a first layer defining an input surface. The deformable structure further includes a second layer coupled to, and offset from, the first layer. At least one of the first layer or the second layer defines a geometric feature. The geometric feature may be configured to collapse the deformable structure at a localized region in response to a force input. The user input device further includes an input structure configured to produce an electrical response based on a magnitude of the force input.

A number of feature refinements and additional features are applicable in the first aspect and contemplated in light of the present disclosure. These feature refinements and additional features may be used individually or in any combination. As such, each of the following features that will be discussed may be, but are not required to be, used with any other feature combination of the first aspect.

For example, in an embodiment, the user input device may further include an electronic device casing. The electronic device casing may include a top surface with an aperture extending therethrough. Further, the deformable structure may be removeably coupled with the electronic device casing at the aperture. The stiffness of the localized region differs from a stiffness of the deformable structure surrounding the localized region. In this regard, the geometric feature may produce a tactile sensation indicative of a keyboard key at the localized region when the force input is received at the deformable structure.

According to another embodiment, the first layer may include a series of ridges resembling keyboard keys in one of a first configuration or a second configuration. The user input device may further include an illumination layer positioned within the electronic device casing. In this regard, when the deformable structure is coupled with the electronic device casing, the illumination layer is configured to: (a) illuminate a first set of symbols at the first layer when the ridges correspond to the first configuration; and (b) illuminate a second set of symbols at the second layer when the ridges correspond to the second configuration.

In another embodiment, the geometric feature may be a first geometric feature defined by the first layer. In this regard, the user input device may further include a second geometric feature defined by the second layer. In some cases, the first and second geometric features cooperate to collapse the deformable structure at the localized region.

In a particular embodiment, the geometric feature may include a protrusion extending from a surface of the at least one of the first or the second layers. The protrusion may be substantially defined by one of: (a) a square shape; (b) a circular shape; or (c) a non-symmetrical shape. The protrusion may include a substantially hollow region.

In another embodiment, the protrusion may include a force-concentrating nub positioned within the substantially hollow region. The protrusion defines a chamfer. Additionally or alternatively, the geometric feature may be a debossed region of the at least one of the first layer or the second layer.

In this regard, a second aspect of the present disclosure includes a method of operating an input device. The method includes receiving a force input at a deformable structure. The force input may cause a portion of the deformable structure to collapse. The method further includes detecting a magnitude of the force input. The method further includes generating haptic feedback using the magnitude of the force input and a geometric feature of the collapsed portion.

A number of feature refinements and additional features are applicable in the second aspect and contemplated in light of the present disclosure. These feature refinements and additional features may be used individually or in any combination. As such, each of the following features that will be discussed may be, but are not required to be, used with any other feature combination of the second aspect.

For example, in an embodiment, generating haptic feedback may further include, in response to the magnitude being greater than a threshold, producing at least one of a vibrotactile effect or an audial effect at the collapsed portion. The threshold may be dynamically variable. In some cases, the geometric feature may be operative to control the deformable structure to operate according to a predefined force-displacement curve.

In another embodiment, the geometric feature includes at least one of a height dimension or a width dimension of a cavity encompassed within the deformable structure. In some cases, the detecting of the magnitude may further include measuring a capacitance at an input structure coupled with the deformable structure. A magnitude of the capacitance may correspond to the magnitude of the force input received at the deformable structure.

In this regard, a third aspect of the present disclosure is directed to a user input device. The user input device includes an input surface configured to receive a user input. The user input device further includes a reinforcement component positioned below the input surface. The reinforcement component may include a tactile feedback structure. The user input device further includes an input structure having at least one electrode and configured to detect the user input. The input surface may be configured to deform the reinforcement component in response to the user input. The tactile feedback structure may provide a predetermined tactile effect once the input surface deforms the reinforcement component.

A number of feature refinements and additional features are applicable in the third aspect and contemplated in light of the present disclosure. These feature refinements and additional features may be used individually or in any combination. As such, each of the following features that will be discussed may be, but are not required to be, used with any other feature combination of the third aspect.

For example, in an embodiment, the input surface may be separated from the reinforcement component by a support structure. The reinforcement component may include a base portion. The tactile feedback structure may include a raised portion having a height dimension that differs from a height dimension of the base portion. Additionally or alternatively, the tactile feedback structure may include a biasing mechanism configured to magnetically impede deformation of the reinforcement component.

In another embodiment, the reinforcement portion may include a set of layers affixed together via an array of perpendicularly offset fibers. The tactile feedback structure may include a bulbous portion of the reinforcement component.

According to another embodiment, the user input may include a gesture performed on the input surface. In this regard, the tactile feedback structure may be configured to produce a haptic effect in response to the gesture.

In addition to the exemplary aspects and embodiment described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
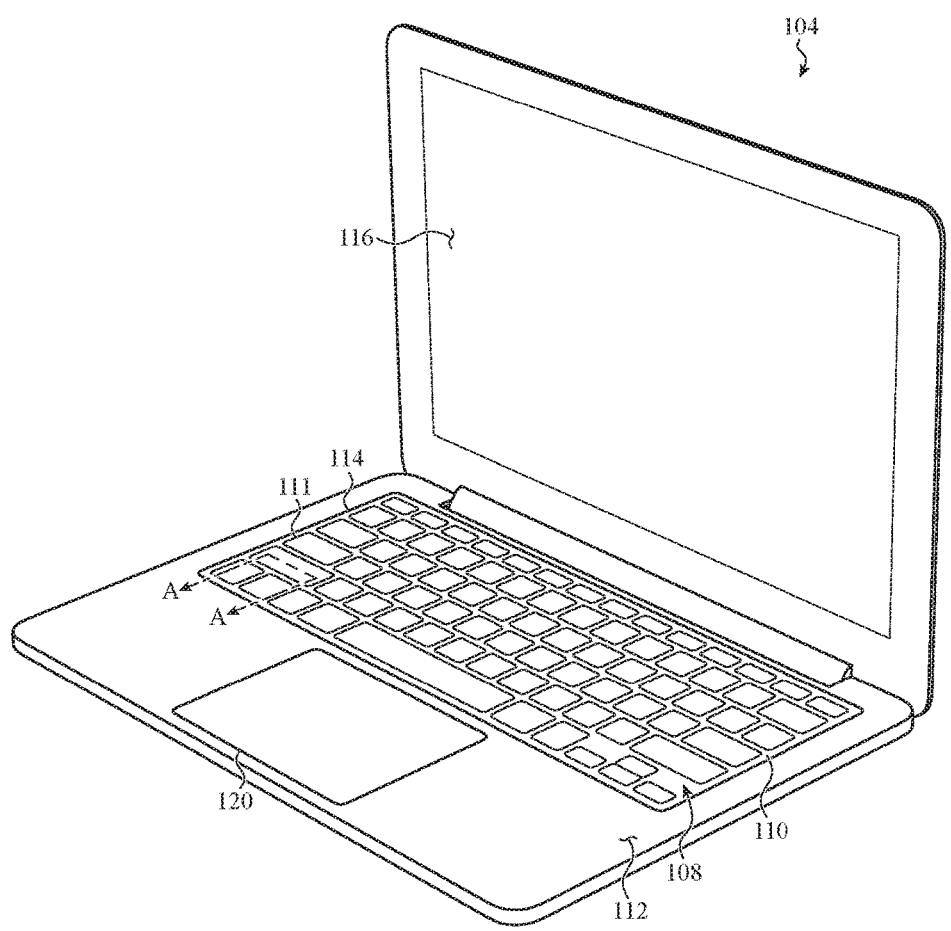
FIG. 1 depicts a sample input device including a deformable structure resembling a keyboard.

The description that follows includes sample systems, methods, and apparatuses that embody various elements of the present disclosure. However, it should be understood that the described disclosure may be practiced in a variety of forms in addition to those described herein.

The present disclosure describes systems, devices, and techniques related to user input devices and, more particularly, to a user input device having a deformable input surface. The deformable input surface may provide tactile feedback to a user in response to a force input. The user input device may be configured to receive input free of various mechanical mechanisms associated with mechanical keyboards, including scissor mechanisms, butterfly mechanisms, and mechanical dome switches. Notwithstanding the lack of such mechanisms, the deformable input surface may simulate the experience of typing on a mechanical keyboard, according to the embodiments described herein. As one non-limiting example, the deformable input surface may collapse, deform, or deflate at a localized region in response to a force input to provide a predetermined tactile effect.

The user input device may include various components that operate together to simulate the experience of typing on a mechanical keyboard. In one embodiment, the user input device includes a deformable structure that defines the deformable input surface. The deformable structure may include at least a first layer and a second layer that cooperate to provide a predetermined tactile effect. For example, the first layer may define the deformable input surface or input layer and the second layer may define a reinforcement layer positioned below, and offset from, the input layer. The input layer may impact the reinforcement component in response to a force input. This may allow the tactile response of the input layer to be based, or dependent on, the reinforcement component and/or other structures, components, or features of the deformable structure.

One or both of the input layer and the reinforcement layer may define a geometric feature. The geometric feature may be configured to provide a predetermined tactile effect at a localized region of the deformable structure. For example, the geometric feature may be defined by various shapes, sizes, orientations, patterns, textures, and materials such that the geometric feature or features simulate the experience of typing on a mechanical keyboard at the localized region. Each of the shape, size, orientation, pattern, textures, materials, and/or other geometric features may be modified and customized to produce a particular tactile effect. Accordingly, the predetermined tactile effect may be based on the physical attributes of the deformable structure and the combination or arrangement or various geometric features arranged therein. As one non-limiting example, the physical attributes of the deformable structure may define a relationship between the amount of force required to move a localized region of the input layer over a range of distances. This relationship may be expressed by a force-displacement curve, and the localized region may operate according to this curve to simulate typing on a mechanical keyboard.

In a particular embodiment, the geometric feature may include a protrusion, embossed, or otherwise raised portion extending from a surface of the reinforcement layer. In some cases, the protrusion may be substantially hollow. In this regard, the hollow protrusion may bow or collapse in response to a force input received at the input layer such that the deformable structure collapses at a localized region to produce a predetermined tactile effect. Additionally or alternatively, the geometric feature may include a substantially enclosed cavity positioned between the input layer and the reinforcement layer. The substantially enclosed cavity may cushion a force input received at the input layer such that a user experiences counteracting or dampening forces. In other embodiments, the input layer and the reinforcement component may be two of a set of layers affixed together via an array of perpendicularly offset fibers and form a bulbous portion of the deformable structure. The bulbous portion may deform, deflect, and/or collapse to simulate typing on a mechanical keyboard. It will be appreciated that the foregoing configurations of the deformable structure and associated geometric features are presented for purposes of illustration. Additional configurations, contemplated within the scope of the present disclosure, are described in greater detail below.

The user input device may also include a haptic feedback structure coupled to (or positioned within) the deformable structure. The haptic feedback structure may be configured to produce various vibrotactile effects, audial effects, and/or other haptic effects to enhance the tactile sensations of the deformable structure. As one example, the haptic feedback structure may produce a vibration and/or sound in response to a force input received at the deformable structure. The vibration and/or sound may indicate to a user that the force input caused the user input device to produce a user input signal, for example, such as that used to control a computing device. In some instances, a computing device or other user interface may be used to tune the haptic effects such that the haptic feedback structure produces the haptic effects in response to the force input exceeding a dynamically adjustable threshold value. Accordingly, the haptic effects may be adjusted and/or dynamically varied based on user preferences.

The user input device may generate a user input signal in response to a touch input, force input, gesture, and/or other indication from a user generally performed relative to one or more regions of the deformable structure. This may be accomplished free of many mechanical mechanisms associated with mechanical keyboards. As one example, the user input device may include an input structure coupled to (or positioned within) the deformable structure. The input structure may include one or more electrodes that may form, or define a component of, a force and/or touch sensor. In a particular embodiment, the input structure may include a capacitance-based force sensor having two electrodes separated by a compliant layer. A force received at the input layer may alter a capacitance measured between the two electrodes, thereby causing the user input device to generate an electrical response or user input signal. In other embodiments, other touch sensors and force sensors are contemplated, including induction based sensing configurations, which may be used to detect a gesture or other indication from a user.

The input structure may allow the user input device to detect a magnitude of a force input received at the input layer. For example, when the input structure includes a capacitance-based force sensor, a change in capacitance may be correlated with a magnitude of the force input. The magnitude of the force input may be used to control various functions of the user input device, including the production of haptic effects at the haptic feedback structure (described above), as well as the generation of the user input signal. For example, the user input device may be configured to generate a user input signal in response to the magnitude of the force input exceeding a predetermined or threshold value. This may allow a user to create a customizable user input device that generates haptic feedback and/or user input signals based on a set of user customizable preferences, for example, including based on the intensity of a user's keystrokes.

The deformable structure, input structure, haptic feedback structure and other associated components of the user input device may be arranged within an electronic device casing and configured to control a function of a computing device. In one implementation, the deformable structure may be removeably coupled with the electronic device casing. This may allow a set of deformable structures (each having unique configurations, geometries, or the like) to be interchanged with the electronic device casing. Accordingly, the user input device may be adaptable to couple with various different deformable structures, each configured to produce different predetermined haptic effects. In some cases, the user input device may include an illumination layer positioned within the electronic device casing. The illumination layer may be configured to display indicia at the deformable structure. The indicia may correspond to the particular characteristics of the deformable structure coupled with the electronic device casing. Analogously, the user input structure and/or the haptic feedback structure may also adapt to the particular characteristics of the deformable structure coupled with the electronic device casing. Accordingly, the user input device of the present disclosure may be adaptable and configurable to simulate the experience of typing on a mechanical keyboard (and controlling a function of a computing device) according to a user's preferences.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

FIG. 1 depicts a sample input device 104 having a deformable structure 108, such as the deformable structure generally discussed above and described in greater detail below. The deformable structure 108 may define an input surface 110. The input device 104 may generate a user input signal in response to a touch input, force input, gesture, and/or other indication performed relative to the input surface 110. The input surface 110 may resemble a keyboard having a set of defined ridges or keys, such as keys 111. In some cases, the keys 111 may be raised or embossed portions extending from the input surface 110. The keys 111 may also be defined or indicated by etching patterns that extend into the input surface 110. For example, the etching pattern may define a boundary of one or more keys 111. In other cases, the input surface 110 may be substantially planar. The deformable structure 108 may be positioned over an input structure (e.g., such as a capacitance-based force sensor, discussed in greater detail below with respect to FIG. 2). The deformable structure 108 may provide tactile feedback to a user in response to a force input to simulate typing on a mechanical keyboard.

In a non-limiting example, as shown in FIG. 1, the input device 104 may be a laptop computer. However, it is understood that input device 104 may be any suitable device that operates with the deformable structure 108 to receive input for controlling a computing device. Other examples of input devices may include wearable devices (including watches, glasses, rings, or the like), health monitoring devices (including pedometers, heart rate monitors, or the like), and other electronic devices, including digital cameras, printers, scanners, security systems or devices, or electronics for automobiles, among other electronic devices. For purposes of illustration, FIG. 1 depicts the input device 104 as including the deformable structure 108, an enclosure 112, a display 116, and one or more input/output members 120. It should be noted that the electronic device 104 may also include various other components, such as one or more ports (e.g., a charging port, a data transfer port, or the like), communications elements, additional input/output members (including buttons), and so on. As such, the discussion of any input, computing, or electronic device, such as input device 104, is meant as illustrative only.

The deformable structure 108 may be positioned within the enclosure 112. In one embodiment, the deformable structure 108 may be positioned within the enclosure 112 at aperture 114. The aperture 114 may extend through a top surface of the enclosure 112 and may be configured to removeably couple the deformable structure 108 to the enclosure 112. For example, the aperture 114 may include various securement features, such as pins, clips, latches, biasing elements, or the like that allow the deformable structure 108 to be attached and subsequently released from the enclosure 112. The securement features may be configured to removeably couple any of an ecosystem of deformable structures to the enclosure 112. This may allow various different deformable structures to be removeably coupled with the enclosure 112.

In this manner, a user may interchange various different deformable structures with the enclosure 112 according to his or her preferences. As one example, a user may removeably couple a particular deformable structure to the enclosure 112 in order to achieve a desired tactile effect. Stated differently, certain deformable structures may have a particular stiffness, texture, responsiveness, and/or other configuration or characteristic that correspond to a user's preferences. A user may therefore use a particular deformable structure in conjunction with the input device 104 that aligns with his or her preferences. Additionally or alternatively, a user may interchange deformable structures with the enclosure 112 in order to provide input to deformable structures having different arrangements of keys or other geometries, which may facilitate controlling the input device 104 in a particular environment. To illustrate, a user may removeably couple a first deformable structure having a first arrangement of keys (e.g., corresponding to a set of keyboard inputs) and a second deformable structure having a second arrangement of keys (e.g., corresponding to a set of video game inputs) to the enclosure 112. This may allow a user to experience different tactile effects, as may be appropriate for different computing environments (e.g., typing, controlling a video game, or the like).

Figure 2:
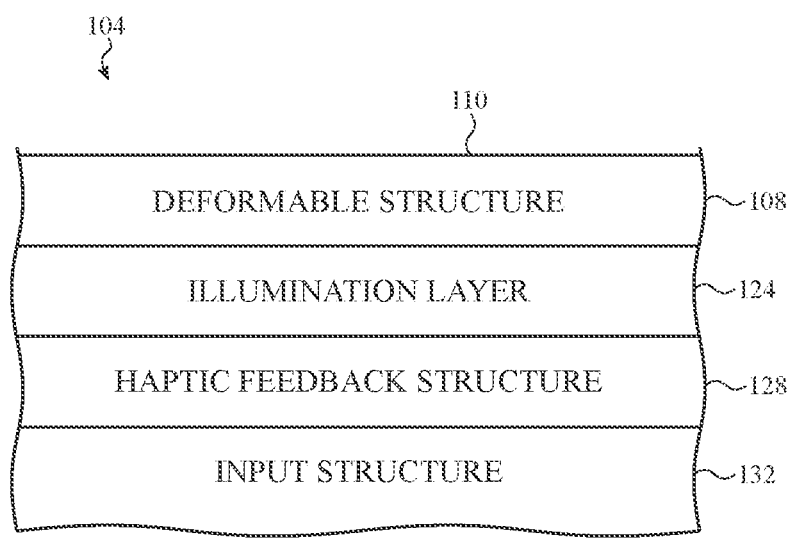
FIG. 2 depicts a simplified cross-sectional view of layers of the sample input device of FIG. 1, taken along line A-A of FIG. 1.

FIG. 2 is a simplified cross-sectional view of layers of the input device 104, taken along line A-A of FIG. 1. In particular, FIG. 2 presents a simplified cross-sectional view of the of the input device 104 at a portion of the aperture 114 within which the deformable structure 108 is positioned. As depicted, the user input device 104 may include the deformable structure 108, an illumination layer 124, a haptic feedback structure 128, and an input structure 132.

The deformable structure 108 may be formed from any appropriate "soft good" material that exhibits sufficiently compliant and flexible characteristics. In one embodiment, the deformable structure 108 may be formed from silicone or a silicone composite (e.g., such as a silicone layer affixed to a substrate having a greater stiffness material). This may allow the deformable structure 108 to be sufficiently elastic or resilient such that the deformable structure 108 does not permanently deform from applied force (e.g., the deformable structure 108 may substantially return to an original or un-deformed shape after the force ceases). The deformable structure 108 may also be constructed from a material having a particular texture (e.g., rough, smooth, irregular) to enhance a tactile effect produced by the deformable structure 108. The deformable structure 108 may not be limited to silicone, and may also include any other appropriate materials consistent with the various embodiments presented herein, including leather, plastic, nylon, fluroelastomeric polymer and/or another suitable polymer, rubber, or other flexible material. Where the deformable structure 108 includes a leather material, the leather may be a natural or manufactured leather.

The deformable structure 108 may have a predetermined durometer measurement that facilitates the production of a desired tactile effect. Stated differently, the deformable structure 108 may be constructed from a material that has a particular resistance to permanent indentation. It may be desirable to construct the deformable structure 108 from a material having a defining resistance to permanent indentation to control the ability of the deformable structure 108 to return to an undeformed shaped subsequent to the application of force. This may be measured by on a durometer scale. As one example, when the deformable structure 108 is constructed from silicone, the deformable structure 108 may have a 10, 15, 25, 30, or 60 durometer measurement. In other cases, the deformable structure 108 may be constructed from other materials that may have different durometer measurements.

As described in greater detailed below (e.g., with respect to FIGS. 3A-4B), the deformable structure 108 may be formed as a single, integrally-formed component or may be formed from multiple discrete components. The different components may be affixed to one another via an adhesive. In another embodiment, the materials may be affixed via an array of perpendicularly offset fibers extending through at least a portion of the materials. Further, the deformable structure 108 may be formed from components that are constructed from multiple different materials. As one example, the deformable structure 108 may be substantially formed from silicone and include a plastic component (such as a key cap) positioned on, or adjacent to, the input surface 110. Additionally, the deformable structure 108 may be substantially formed from silicone and include a fabric cover (e.g., as described with respect to FIG. 3A) positioned on or over the input surface 110. This may allow the deformable structure 108 to define a localized region having a different texture, stiffness, or other physical attribute than other portions of the deformable structure 108. It will be appreciated that, in other embodiments, other combinations of materials are contemplated to achieve a particular tactile effect.

The deformable structure 108 may be configured to simulate the experience of typing on a mechanical keyboard. Accordingly, as described in greater detail below (e.g., with respect to FIGS. 3A-4B), the deformable structure 108 may include various geometric features, tactile feedback structures, or other components that operate to produce a tactile effect at the input surface 110 in response to a force input. In one embodiment, such features may be configured to collapse the deformable structure 108 at a localized region of the input surface 110 (e.g., such as at or near one of the keys 111). Additionally or alternatively, a stiffness of the localized region may be different than a stiffness or a localized region and/or exhibit another characteristic that distinguishes the localized region from other portions of the input surface 110. It will be appreciated that the deformable structure 108 may be constructed in a variety of manners to produce a desired tactile effect, according to the embodiments described herein.

The user input device 104 may also include the illumination layer 124. The illumination layer 124 may be a light source (e.g., including an array of LEDs) disposed below (or within) the deformable structure 108. The illumination layer 124 may be configured to illuminate portions of the deformable structure 108. As one example, the illumination layer 124 may illuminate various localized regions of the input surface 110 to indicate various functions that may be executed by a computing a device. In particular, the illumination layer 124 may be configured to display an updated or virtual arrangement of symbols at the input surface 110 indicative of a function for controlling a computing device.

The illumination of the deformable structure 108 may dynamically vary based on the configuration or physical attributes or features of the deformable input structure. For example, as described above with respect to FIG. 1, the deformable structure 108 may be one of an ecosystem of deformable structures, each having a particular arrangement of keys, textures, embossments, and/or other material properties or configurations. Each of the ecosystem of deformable structures may be removeably coupleable with the user input device 104. This may allow the illumination layer 124 to display different sets of symbols or other indicia at the deformable structure 108 depending on the particular configuration of the deformable structure. To illustrate, the illumination layer 124 may display a first set of symbols when the deformable structure 108 defines a first set of ridges, and display a second, different set of symbols when the deformable structure 108 defines a second, different set of ridges. Stated differently, the user input device 104 may be configured to detect a particular configuration of the deformable structure (e.g., distinguish between deformable structures having different geometries, material properties, or the like), and illuminate the deformable structure according to the detected particular configuration. This may enhance customization of the user input device 104.

The user input device 104 may also include the haptic feedback structure 128. The haptic feedback structure 128 may include various components that provide vibrotactile, audial, and/or other haptic effects. The haptic feedback structure 128 may be coupled to (or positioned within) the deformable structure 108. This may allow the haptic feedback structure 128 to provide various haptic effects to the input surface 110 (or other portion of the user input device 104) in order to enhance the sensation of typing on a mechanical keyboard.

The haptic feedback structure 128 may provide haptic feedback to a localized region of the input surface 110 (e.g., such as key 111). As one example, the haptic feedback structure 128 may be configured to provide localized vibrations in response to a detected touch and/or force input received at or near the input surface 110. Localization of the touch or tactile sensation may be accomplished by providing, in one implementation, a localized tactile vibration or displacement along a portion of the input surface 110. The haptic feedback structure 128 may be configured to produce a vibration or displacement that is more pronounced over the localized region. In this regard, the user input device 104 may be configured to minimize or dampen the haptic output over regions that are not within the localized region. This may mitigate vibratory cross-talk between multiple haptic elements or device components. Additionally or alternatively, the haptic feedback structure 128 may be configured to provide generalized haptic feedback to a substantial majority (or the entire) deformable structure 108.

To facilitate the foregoing, the haptic feedback structure 128 may include various electromechanical devices (or combinations of devices), including various piezoelectric transducers, electromechanical devices, and/or other vibration inducing devices. Such vibrations (or displacements) may be perceived as, for example, a clicking, popping, and/or other audial or tactile cue to a user and may be used to provide feedback or a response to a touch and/or force input on the input surface 110. The haptic feedback structure 108 may also provide other audial cues, for example, via a speaker or other sound producing device included within the haptic feedback structure 128. Using these and other techniques, the haptic feedback structure 128 may be configured to mimic or simulate the haptic feedback of a mechanical key used in a keyboard having mechanically actuated key caps. In some cases, the haptic feedback structure 128 may also produce haptic effects to indicate a boundary of localized regions of the input surface 110, for example, to simulate a keyboard surface having discrete, mechanically actuated keys.

The user input device 104 may also include the input structure 132. The input structure 132 may include any appropriate sensor configured to detect one or more of a force input, a touch input, a gesture, and/or other indication of user input performed at or near the input surface 110. The input structure 132 may generate an electrical response or user input signal for controlling a computing device in response to the detection of one or more of the foregoing inputs. The input structure 132 may detect input free of various mechanical mechanisms used in a mechanical actuated keyboard. Rather, the input structure 132 may include one or more electrodes to detect input, according to the embodiments described herein.

In a particular embodiment, the input structure 132 may include a capacitive-based force sensor. For example, the input structure 132 may include a pair of electrodes separated by a compliant material. The compliant material may be elastically deformable and positioned to prevent the pair of electrodes from contacting. A capacitance may be measured between the pair of electrodes. The capacitance may be used to determine a magnitude of a force input received at the input surface 110. To illustrate, the capacitance may vary with a distance separating the pair of electrodes. Thus, as the deformable structure 108 is depressed (causing the distance between the pair of electrodes to decrease), the input structure 132 may measure a change in capacitance between the pair of electrodes. The change in capacitance may be correlated with the magnitude of the force input. When the capacitance exceeds a threshold, the user input device 104 may initiate a switch event. Additionally or alternatively, the capacitance may be associated with a range of non-binary inputs, such that the user input device 104 may trigger multiple, different switch events in response to multiple different magnitudes of force of the force input.

In other implementations, the input structure 132 may include strain-sensitive elements (e.g., piezoelectric sensors, strain gauges, or the like) that exhibit a change in electrical property (e.g., an electrical response) in response to a mechanical stress. This may allow the input structure 132 to detect a force input, including detecting a magnitude of a force input, at the input surface 110. As another example, the input structure 132 may be a component of an inductive sensing configuration. This may allow the input structure 132 to detect the proximity of an actuating object as it approaches the input surface 110, which may be useful for detecting various gestures performed at the deformable structure 108. In other embodiments, other sensing configurations are contemplated, including embodiments where the input structure 132 includes a resistive sensing configuration and/or an optical sensing configuration.

Figure 3A:
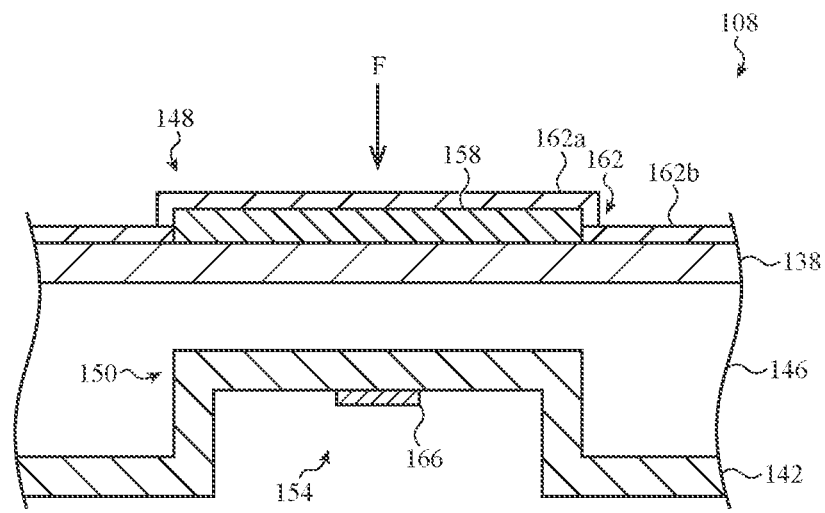
FIG. 3A depicts a cross-sectional view of the deformable structure of FIG. 2, taken along line A-A of FIG. 1, according to one embodiment.

FIG. 3A is a cross-sectional view of the deformable structure 108 of FIG. 2, taken along line A-A of FIG. 1. The deformable structure 108 may include a first layer 138 and a second layer 142. The first layer 138 may define an input layer or input surface of the deformable structure 108 and the second layer 142 may define a reinforcement layer or reinforcement component of the deformable structure 108, as described herein. The second layer 142 may be coupled to, and offset from, the first layer 138. For example, the second layer 142 may be coupled to the first layer 138 via any appropriate structure of the user input device, including support structure 174 described with respect to FIG. 3D. As shown in FIG. 3A, the first layer 138 and the second layer 142 may be separated by offset 146.

The first layer 142 may be configured to deform, deflect, or collapse in response to a force input F. The force input F may cause the first layer 138 to deform such that it is displaced towards the second layer 142. This may cause the first layer 138 to impact the second layer 142. Upon impact, the second layer 142 may also deform, deflect, or collapse. In this manner, the first layer 138 and the second layer 142 may cooperate to produce a predetermined tactile effect in response to the force input F. For example, the second layer 142 may affect the tactile response of the first layer 138 based on one or more characteristics of the second layer 142. In one embodiment, the first and second layers 138, 142 may be constructed with a particular set of characteristics (described in greater detail below) that are configured to simulate the tactile sensation of exerting force on a mechanical keyboard key in response to the force input F.

Broadly, the shape, size, orientation, patterns, texture, and materials of the deformable structure 108 (including first and second layers 138, 142) may be constructed and customized in a manner that produces a particular tactile sensation of the deformable structure 108. For example, a thickness or the first layer 138 may be different than (or equal to) a thickness of the second layer 142, which may alter the force required to deform the deformable structure 108. As another example, a thickness of the offset 146 may be varied. This may alter the responsiveness of the deformable structure 108 to a force input, for example, by altering the amount the first layer 138 deforms before impacting the second layer 142. Additionally or alternatively, the stiffness of the first and second layers 138, 142 may be varied to produce a particular tactile effect. For example, the first and second layers 138, 142 may be constructed from different materials, such as constructing the second layer 142 from a stiffer material. This may allow the deformable structure 108 to increase the force required to deform the first layer 138, when the first layer 138 impacts the second layer 142. As another example, the texture, height, shape or other geometry of the first layer 138 may be varied. This may allow the deformable structure 108 to have a particular tactile sensation based on a user's preferences.

The deformable structure 108 may also include various geometric features, tactile feedback structures, and/or other components or features that facilitate the tactile sensations of the deformable structure 108. As one example, one or both of the first and second layers 138, 142 may define a geometric feature. The geometric feature may be configured to collapse the deformable structure 108 at a localized region in response to the force input F. For example, the geometric feature may be configured to collapse the deformable structure 108 at a localized region 148. The localized region 148 may be defined by a portion of the first layer 138 configured to receive a touch and/or force input for controlling a computing device. The localized region 148 may correspond to the position of the geometric features or features positioned within the deformable structure 108. In some cases, the localized region 148 may be indicated on the input surface by an etching pattern extending into the deformable structure 108. The geometric feature may be any appropriate shape or construction in order to produce a desired tactile effect. In this regard, the geometric features and configuration of the deformable structure 108 described with respect to FIG. 3A are presented as non-limiting and optional embodiments. Other geometric features and configurations of the deformable structure 108 are contemplated within the scope of the present disclosure, for example, such as that described with respect to FIGS. 3B-3M.

In the embodiment of FIG. 3A, the second layer 142 may define a protrusion 150. The protrusion 150 may be a geometric feature of the deformable structure 108, as described above. The protrusion 150 may extend into the offset 146 and in a direction extending towards the first layer 138. The protrusion 150 may define a substantially hollow region, such as cavity 154, below the second layer 142. The protrusion 150 may be shaped in various manners to produce a desired tactile effect. For example, the protrusion 150 may be substantially square shaped, circular shaped, or non-symmetrically shaped. The protrusion 150 may have a rounded, chamfered, angled, or otherwise tailored surface. This may facilitate collapsing the protrusion in a desired manner. In other instances, other shapes of the protrusion 150 are contemplated.

The first layer 138 may deform towards, and subsequently impact, the protrusion 150, in response to the force input F. Upon impact, the protrusion 150 may bow or collapse. As one possibility, the protrusion 150 may bow or collapse into the cavity 154. The bowing or collapsing of the protrusion 150 into the cavity 154 may provide a tactile effect at a localized region of the first layer 138 (e.g., such as localized region 148) that simulates typing on a mechanical keyboard. For example, a user may experience a first tactile sensation as the first layer 138 deforms into the offset 146 and towards the second layer 142. Further, a user may experience a second, different tactile sensation as the first layer 138 impacts the protrusion 150 of the second layer 142. This sequence of tactile sensations may create the experience of typing on a mechanical keyboard structure, although no mechanical keyboard is present. In this manner, the first and second layers 138, 142 may cooperate to collapse the protrusion 150 to produce a predetermined tactile effect.

In other embodiments, other tactile feedback structures are contemplated that facilitate the tactile sensation of the deformable structure 108. As one non-limiting example, the deformable structure 108 may include a pair of magnets or other biasing mechanism. For example, the first layer 138 may include a first magnet and the second layer 142 may include a second magnet. The polarity of the magnets may be arranged such that the magnets impede deformation of the first layer. That is, the magnets may repel one another when the first layer 138 deforms toward the second layer 142. This may enhance the tactile sensation of the deformable structure 108 by providing a counteracting force (e.g., due to the counteracting magnetic fields of the magnets) in response to the force input F.

As described above with respect to FIG. 2, the deformable structure 108 may be coupled with the input structure 132. In one embodiment, the input structure 132 may be configured to measure a magnitude of the force input F. As described in greater detail below with respect to FIG. 5, the magnitude of the force input F may correspond to a particular displacement of the deformable structure 108, as expressed by a force-displacement curve. The input structure 132 may measure the magnitude of the force input F across a continuum of values. This may allow the input structure 132 to measure the magnitude of the force input F before the first layer 138 impacts the second layer 142, as well as measure the magnitude of the force input F after the first layer 138 impacts the second layer 142.

The input structure 132 may trigger a switch event and/or control a function of a computing device based on the magnitude of the force input F. For example, the input structure 132 may trigger a switch event in response to the magnitude of the force input exceeding a threshold. The threshold may be predetermined and/or dynamically variable based on a set of user customizable preferences. In this regard, as described in greater detail below with respect to FIG. 5, a switch event may not depend on any mechanical contact within the deformable structure. Stated differently, rather than triggering the switch event upon the first layer 138 contacting the second layer 142, the switch event may be triggered based on the magnitude of the force input F. This may allow the user input device 104 to create a customizable typing experience that is sensitive or tunable to a user's preferences.

The deformable structure 108 may also include various other optional components that enhance the tactile effects of the deformable structure 108. Among other characteristics, these components may modify a stiffness or texture of the deformable structure 108. Further, such components may concentrate force or reduce stresses at various portions of the deformable structure 108, which may influence the tactile sensations of the deformable structure 108. It will be appreciated that such components are optionally included (in any combination) within the deformable structure 108, and in some embodiments may be absent from the deformable structure 108.

As depicted in FIG. 3A, the deformable structure 108 may optionally include keycap 158. The keycap 158 may be a substantially solid component that increases a rigidity of the deformable structure 108 at a localized region. More generally, the keycap 158 may be any structure that is attachable to a portion of the deformable structure 108 to increase or otherwise alter a stiffness of the deformable structure 108, for example, at the localized region 148. As shown, the keycap 158 may be positioned on a surface of the first layer 138 and extend substantially over the localized region 148. The keycap 158 may be similar in size to the geometric feature of one, or both, of the first and second layers 138, 142. For example, the keycap 158 may have a similar width dimension as that of the protrusion 150.

The keycap 158 may extend above the first layer 138 to define a ridge, protrusion, embossment, or other feature that may resemble a keyboard key. For example, and with reference to FIG. 1, the keycap 158 may define one or more of the keys 111 of input surface 110. The keycap 158 may have rounded, angled, chamfered, or otherwise shaped corners configured to produce a predetermined tactile effect. This may enhance the tactile sensations of the deformable structure 108 by creating a series of raised or embossed portions of the deformable structure 108 that may feel similar to keys that extend from a mechanical keyboard. The raised or embossed portion may also be surrounded by various etching patterns to further identify the keys 111 and enhance the tactile effect of the deformable structure 108. The height and size of the keycap 158 may be varied to produce a particular tactile effect. For example, the keycap 158 may be larger or smaller such that the deformable structure 108 produces a particular tactile effect based on a user's preferences.

In this regard, the keycap 158 may also visually indicate a portion of the deformable structure 108 at which a user may exert a force input for controlling a computing device. For example, the position of the keycap 158 may be aligned with the localized region 148 and/or one or more geometric features of the deformable structure 108. Accordingly, a user may exert a force input at the keycap 158 to deform or displace the first layer 138 at the localized region 148 and cause the user input device 104 to generate a user input signal. In some cases, the illumination layer 124 (e.g., as described with respect to FIG. 2) may illuminate a symbol, glyph, or other marking or indicium that may prompt a user to exert a force input at the keycap 158.

As further depicted in FIG. 3A, the deformable structure 108 may optionally include fabric cover 162. The fabric cover 162 may be a relatively thin layer, sheet, or coating extending over the first layer 138 and/or the keycap 158. The fabric cover 162 may be constructed from a leather, nylon, or woven material. When the fabric cover 162 is constructed from leather, it may be a natural or manufactured product. In other embodiments, other materials are contemplated.

As shown in FIG. 3A, the fabric cover 162 includes a cover first portion 162a extending over the first layer 138 and a cover second portion 162b extending over the keycap 158. The fabric cover 162 may enhance the tactile sensations of the deformable structure 108. For example, the fabric cover 162 may have a texture that is different than a texture of the first layer 138 and/or the keycap 158. In a sample embodiment, the fabric cover 162 may have a higher coefficient of friction than the first layer 138 and/or the keycap 158. This may allow a user to more accurately and/or precisely exert a force input on the deformable structure 108.

Additionally or alternatively, the fabric cover 162 may structurally reinforce portions of the deformable structure 108. As one possibility, the cover second portion 162b may have a greater stiffness than other portions of the deformable structure 108 (e.g., including having a greater stiffness than the first cover portion 162a, the keycap 158, and the first layer 138). In one embodiment, the enhanced stiffness may structurally support the first layer 138 in a position above the second layer 142. This may be due to a lattice structure or other structural support member interwoven, or otherwise included within, the second cover portion 162b.

In this regard, the second cover portion 162b (or other portion of the fabric cover 162) may facilitate maintaining the offset 146 between the first and second layers 138, 142. The stiffer second cover portion 162b may also allow a user to tactilely distinguish a location of the localized region 148. For example, the varying degrees of stiffness between the first cover portion 162a and the second cover portion 162b may indicate the position of the localized region 148 to a user. To illustrate, a force input received at the first cover portion 162a may cause the first cover portion 162a (along with the keycap 158 and a portion of the first layer 138 at the localized region 148) to deform, whereas a similar force input received at the second cover portion 162b may not cause a noticeable or substantial displacement of the second cover portion 162b (or associated portion of the first layer 138). As such, this may indicate to a user that a force input exerted at the first cover portion 162a may cause the user input device 104 to generate a user input signal.

The fabric cover 162 may also be configured to seal portions of the deformable structure 108, and other components of the user input device 104, from an external environment. As one example, the fabric cover 162 may form a barrier between internal components of the user input device 104 and various contaminants, such as dust, debris, oils, moisture, or the like that may adversely impact the user input device 104. In this regard, the fabric cover 162 may form a chemically resistant barrier between the internal components of the user input device 104 and an external environment such that the fabric cover 162 does not substantially break down, deform, or otherwise degrade when exposed to such contaminants.

As further depicted in FIG. 3A, the deformable structure 108 may also include brace 166. The brace 166 may be a nub or other feature positioned on the second layer 142 in substantial alignment with the localized region 148. As shown in FIG. 3A, the brace 166 may be positioned within the cavity 154. In one embodiment, the brace 166 may be configured to concentrate forces within the deformable structure 108. For example, the brace 166 may impart rigidity or support to a portion of the protrusion 150 as the cavity 154 collapses due to the impact from the first layer 138. This may allow force or stresses generated within the deformable structure 108 to concentrate at, or around, the brace 166. This may enhance the longevity of the deformable structure 108 by reducing stresses within other portions of the deformable structure 108. Additionally or alternatively, the brace 166 may enhance the tactile sensations of the deformable structure 108, for example, by altering the amount of force required to displace or deform the deformable structure 108 at the localized region 148.

FIGS. 3B-3M depict cross-sectional views of the deformable structure 108 of FIG. 2, taken along line A-A of FIG. 1. In particular, FIGS. 3B-3M present cross-sectional views of alternate embodiments of the deformable structure 108 described above with respect to FIG. 3A. In this regard, it will be appreciated that the foregoing features described with respect to FIG. 3A may be used individually, or in any appropriate combination, to produce a predetermined tactile effect, according to the embodiments described herein. Accordingly, the embodiments of FIGS. 3B-3M are described for purposes of illustration and are not intended as limiting. Other alternate embodiments of the deformable structure 108 are contemplated within the scope of this disclosure.

As explained in greater detail below with respect to FIGS. 3A-3M, the size, shape, orientation, configuration, and material of the geometric feature or other attributes of the deformable structure 108 may alter the force required to displace or deform a portion of the first layer 138 (e.g., such as the localized region 148). Accordingly, the amount of force required to displace the localized region 148 of FIG. 3A may be different than the amount of force required to displace the localized region 148 of FIGS. 3B-3M at least because of the differing structures and orientations of the protrusion 150. By way of example, the force required to displace the localized region 148 of FIG. 3A may be based on the protrusion 150 extending up towards the first layer 138, and may be expressed by a first force-displacement curve. In this regard, it will be appreciated that various other geometries and configurations of geometric features may be defined by one or both of the first and second layers 138, 142 that may cause a localized region of the deformable structure 108 to operate according to another force-displacement curve. Likewise, the particular shape, texture, size, and other material and mechanical properties of the embodiments of the deformable structure 108 described with respect to FIGS. 3B-3M may produce a particular tactile sensation that may differ from the tactile sensations of the deformable structure 108 described with respect to FIG. 3A. This may allow a user to customize the deformable structure 108 according to his or her individual preferences.

Figure 3B:
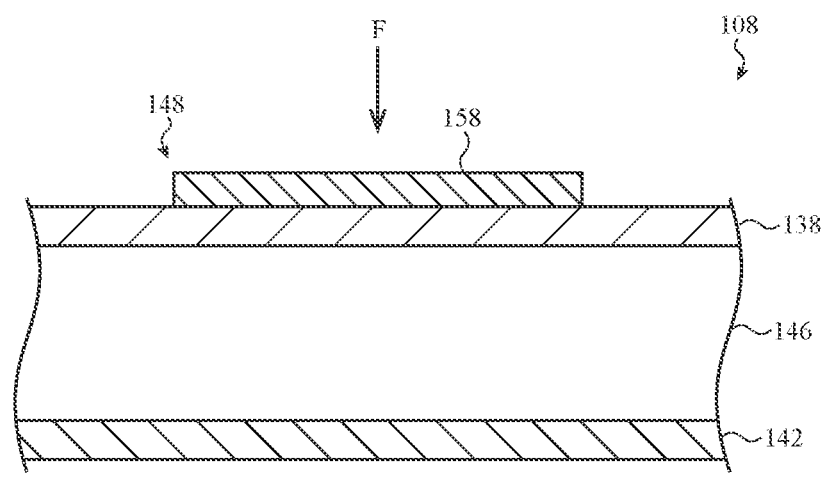
FIG. 3B depicts a cross-sectional view of the deformable structure of FIG. 2, take along line A-A of FIG. 1, according to another embodiment.

As illustrated in the embodiment of FIG. 3B, the deformable structure 108 includes: first and second layers 138, 142; offset 146; localized region 148; and keycap 158. The deformable structure 108 may be substantially analogous to the deformable structure 108 described with respect to FIG. 3A. For example, the first and second layers 138, 142 may cooperate to produce a predetermined tactile effect in response to a force input received at the first layer 128. Further, one or both of the first and second layer 138, 142 may include or define a geometric feature or other tactile feedback structure that facilitates the production of the predetermined tactile effect (e.g., by collapsing or otherwise deforming in response to the force input).

Notwithstanding the foregoing similarities, the second layer 142 may be substantially planar. In this regard, the second layer 142 may be substantially free of a protrusion or recess that interacts with the first surface 138. Additionally, deformable structure 108 is depicted in FIG. 3B without various optional features, such as the fabric cover 162 and the brace 166.

The geometric features of each of the first and second layers 138, 142 may cooperate to produce a predetermined tactile effect. To illustrate, the force input F may cause the first layer 138 to displace or deform into the offset 146 and toward the second layer 142. In some cases, the first layer 138 may impact the second layer 142 in response to the force input F. The keycap 158 may stiffen or strengthen the localized region 148 at which the force input F is received. In this regard, the deformable structure 108 may produce a tactile sensation at least partially based keycap 158 and its associated properties. As one example, the keycap 158 may increase the amount of force required to displace the first layer 138. It will be appreciated that various properties of the keycap 158 may be altered to produce various tactile effects, including properties such as: height, size, texture, and material. For example, the height of the keycap 158 may be varied to vary the stiffness of the deformable structure 108 at the localized region 148, thereby altering the force required to displace the first layer 138.

Figure 3C:
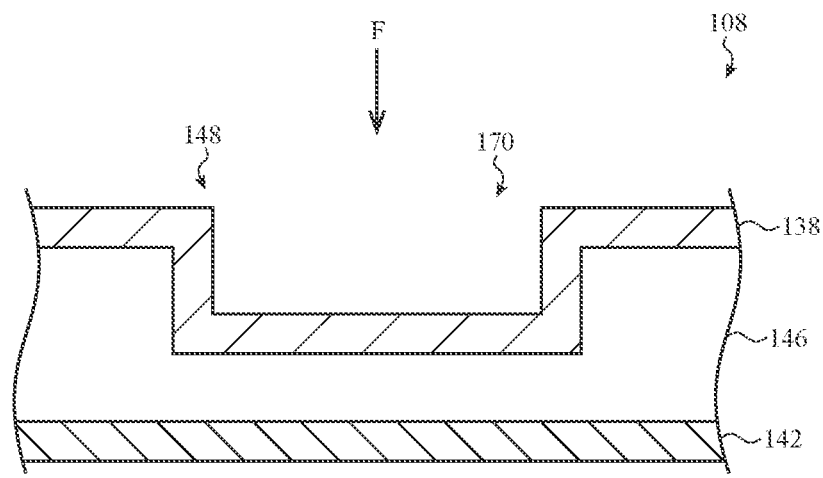
FIG. 3C depicts a cross-sectional view of the deformable structure of FIG. 2, taken along line A-A of FIG. 1, according to another embodiment.

As illustrated in the embodiment of FIG. 3C, the deformable structure 108 includes: first and second layers 138, 142; offset 146; and localized region 148. The deformable structure 108 may be substantially analogous to the deformable structure 108 described with respect to FIG. 3A. For example, the first and second layers 138, 142 may cooperate to produce a predetermined tactile effect in response to a force input received at the first layer 128. Further, one or both of the first and second layer 138, 142 may include or define a geometric feature or other tactile feedback structure that facilitates the production of the predetermined tactile effect (e.g., by collapsing or otherwise deforming in response to the force input).

Notwithstanding the foregoing similarities, the first layer 138 may include a debossed region 170. The debossed region 170 may be an indent, groove, or other depression formed into a surface of the first layer 138 at or near the localized region 148. The debossed region 170 may be any appropriate shape, including circular, square, rectangular, or irregular or non-symmetrical shapes. In this regard, the debossed region 170 may be a geometric feature that facilitates the tactile sensation of the deformable structure 108, for example, by indicating a boundary of the localized region 148, simulating the feel of a mechanical key, or the like. Further, in the embodiment of FIG. 3C, the second layer 142 may be substantially planar. In this regard, the second layer 142 may be substantially free of a protrusion or recess that the interacts with the first surface 138. Additionally, the deformable structure 108 is depicted without various optional features, such as the fabric cover 162 and brace 166.

The geometric features of each of the first and second layers 138, 142 may cooperate to produce a predetermined tactile effect. To illustrate, the force input F may cause the first layer 138 to displace or deform into the offset 146 and toward the second layer 142. In some cases, the first layer 138 may impact the second layer 142 in response to the force input F. More particularly, the force input F may cause the debossed region 170 to deform or displace into the offset 146 and toward the second layer 142. In this regard, the tactile sensation produced by the deformable structure 108 may produce a tactile sensation at least partially based on the debossed region 170 and its associated properties. It will therefore be appreciated that various properties of the debossed region may be altered to produce various different tactile effects, including properties such as: debossed depth, contour, shape, material, or the like. As one example, the depth of the debossed region 170 may be reduced to alter a tactile sensation produced by the deformable structure 108.

Figure 3D:
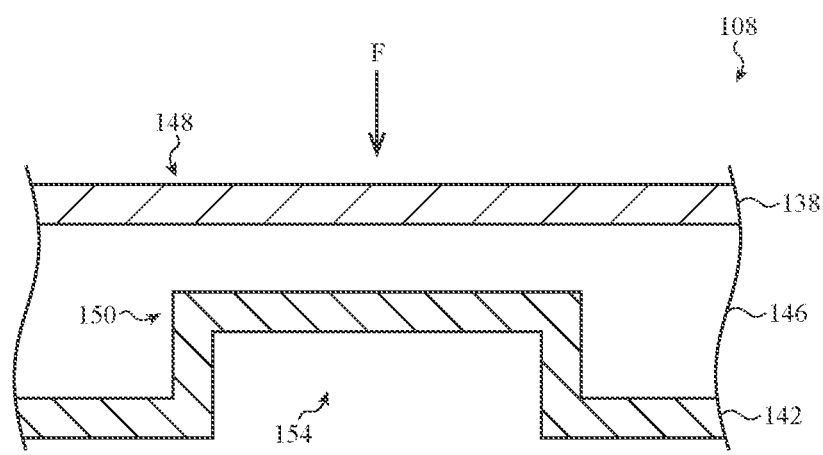
FIG. 3D depicts a cross-sectional view of the deformable structure of FIG. 2, taken along line A-A of FIG. 1, according to another embodiment.

As illustrated in the embodiment of FIG. 3D, the deformable structure 108 includes: first and second layers 138, 142; offset 146; localized region 148; protrusion 150; and cavity 154. The deformable structure 108 may be substantially analogous to the deformable structure 108 described with respect to FIG. 3A. For example, the first and second layers 138, 142 may cooperate to produce a predetermined tactile effect in response to a force input received at the first layer 128. Further, one or both of the first and second layer 138, 142 may include or define a geometric feature or other tactile feedback structure that facilitates the production of the predetermined tactile effect (e.g., by collapsing or otherwise deforming in response to the force input).

Notwithstanding the foregoing similarities, the deformable structure 108 is depicted without various optional features, such as the keycap 158, the fabric cover 160, and the brace 166.

The geometric features of each of the first and second layers 138, 142 may cooperate to produce a predetermined tactile effect. To illustrate, the force input F may cause the first layer 138 to displace or deform into the offset 146 and toward the second layer 142. In some cases, the first layer 138 may impact the second layer 142 in response to the force input F. In particular, the first layer 138 may impact the second layer 142 at the protrusion 150. Upon impact, the protrusion 150 may bend, bow, or collapse into the cavity 154. In this regard, the deformable structure 108 may produce a tactile sensation at least partially based on the protrusion 150 and cavity 154 and the associated properties of each. It will therefore be appreciated that various properties of the protrusion 150 and the cavity 154 may altered to produce various different tactile effect, including properties such as: shape, texture, size, and thickness. As one example, the thickness of the second layer 142 may be increased at the protrusion 150 to stiffen the second layer 142. This may alter the force required to displace the first layer 138 upon impacting the protrusion 150, and thereby alter the tactile effect produced by the deformable structure 108.

Figure 3E:
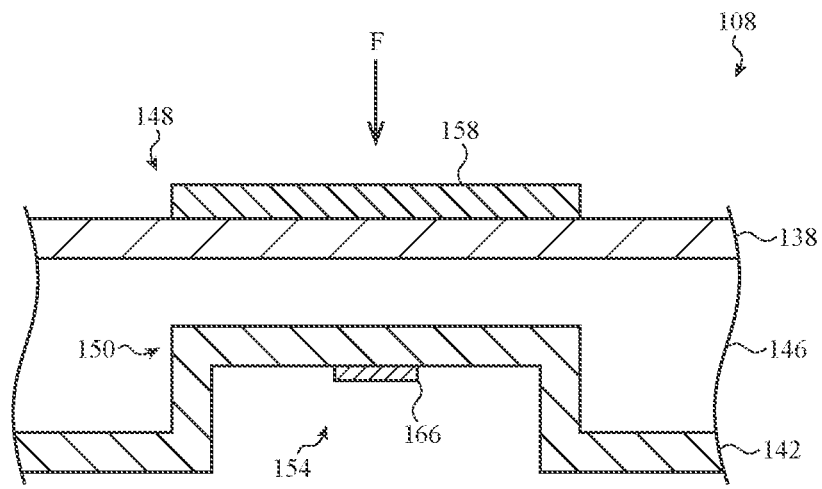
FIG. 3E depicts a cross-sectional view of the deformable structure of FIG. 2, taken along line A-A of FIG. 1, according to another embodiment.

As illustrated in the embodiment of FIG. 3E, the deformable structure 108 includes: first and second layers 138, 142; offset 146; localized region 148; protrusion 150; cavity 154; keycap 158; and brace 166. The deformable structure 108 may be substantially analogous to the deformable structure 108 described with respect to FIG. 3A. For example, the first and second layers 138, 142 may cooperate to produce a predetermined tactile effect in response to a force input received at the first layer 128. Further, one or both of the first and second layer 138, 142 may include or define a geometric feature or other tactile feedback structure that facilitates the production of the predetermined tactile effect (e.g., by collapsing or otherwise deforming in response to the force input).

Notwithstanding the foregoing similarities, the deformable structure 108 is depicted in FIG. 3E without various optional features, such as the fabric cover 162. In this regard, the deformable structure 108 may produce a predetermined tactile effect without the fabric cover 162. As shown in the embodiment of FIG. 3E, the keycap 158, protrusion 150, and brace 166 may cooperate to produce a the predetermined tactile effect. For example, and as described above with respect to FIG. 3A, the first layer 138 may deform towards, and subsequently impact, the protrusion 150 in response to a force input F at the localized region. The keycap 158 may stiffen localized region 148 of the first layer 138 at which the force input F is received. The brace 166 may concentrate forces or stresses generated within the protrusion 150. And as described herein (e.g., with respect to FIG. 3A), one or more properties of the keycap 158, the protrusion, or the brace 166 may be altered to produce various different tactile effects. In some instances, this may allow the deformable structure 108 to simulate the tactile sensation of typing on a mechanical keyboard.

Figure 3F:
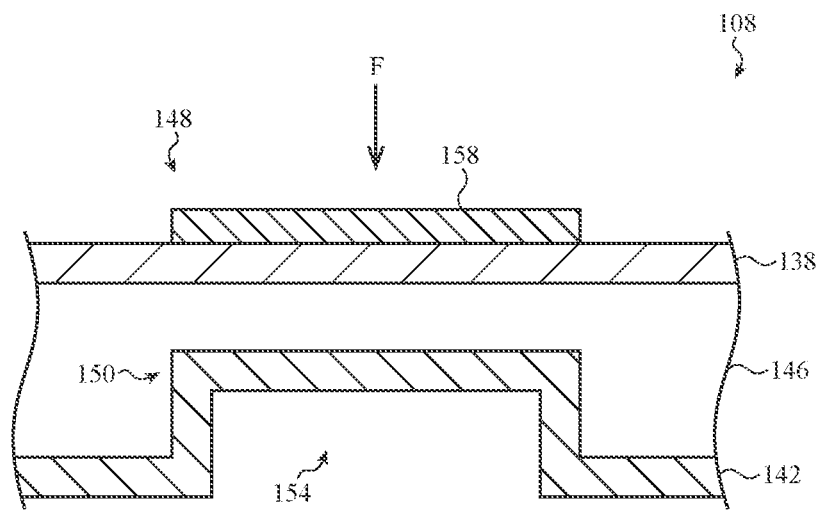
FIG. 3F depicts a cross-sectional view of the deformable structure of FIG. 2, taken along line A-A of FIG. 1, according to another embodiment.

As illustrated in the embodiment of FIG. 3F, the deformable structure 108 includes: first and second layers 138, 142; offset 146; localized region 148; protrusion 150; cavity 154; and keycap 158. The deformable structure 108 may be substantially analogous to the deformable structure 108 described with respect to FIG. 3A. For example, the first and second layers 138, 142 may cooperate to produce a predetermined tactile effect in response to a force input received at the first layer 128. Further, one or both of the first and second layer 138, 142 may include or define a geometric feature or other tactile feedback structure that facilitates the production of the predetermined tactile effect (e.g., by collapsing or otherwise deforming in response to the force input).

Notwithstanding the foregoing similarities, the deformable structure 108 is depicted in FIG. 3E without various optional features, such as the fabric cover 162 and brace 166. In this regard, the deformable structure 108 may produce a predetermined tactile effect without the fabric cover 162 and/or the brace 166. As shown in the embodiment of FIG. 3E, the keycap 158, protrusion 150, may cooperate to produce a predetermined tactile effect. For example, and as described above with respect to FIG. 3A, the first layer 138 may deform towards, and subsequently impact, the protrusion 150 in response to a force input F at the localized region. The keycap 158 may stiffen localized region 148 of the first layer 138 at which the force input F is received. And as described herein, one or more properties of the keycap 158 or the protrusion 150, may be altered to produce various different tactile effects. In some instances, this may allow the deformable structure 108 to simulate the tactile sensation of typing on a mechanical keyboard.

Figure 3G:
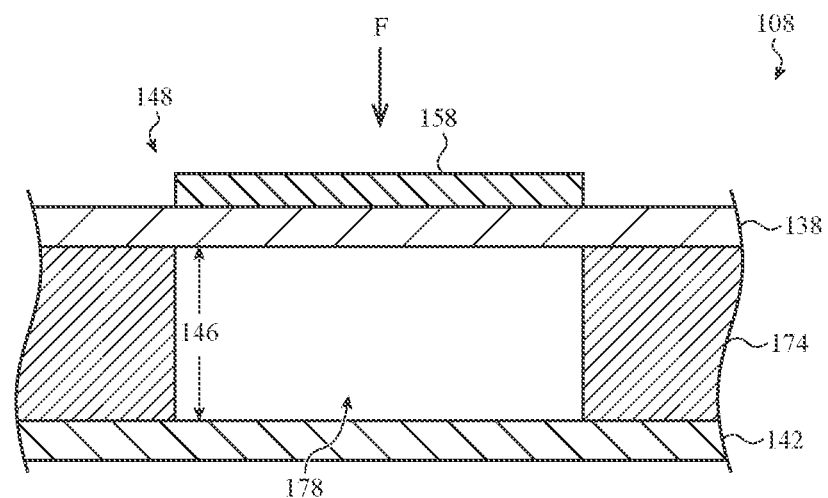
FIG. 3G depicts a cross-sectional view of the deformable structure of FIG. 2, taken along line A-A of FIG. 1, according to another embodiment.

As illustrated in the embodiment of FIG. 3G, the deformable structure 108 includes: first and second layers 138, 142; offset 146; localized region 148; and keycap 158. The deformable structure 108 may be substantially analogous to the deformable structure 108 described with respect to FIG. 3A. For example, the first and second layers 138, 142 may cooperate to produce a predetermined tactile effect in response to a force input received at the first layer 128. Further, one or both of the first and second layer 138, 142 may include or define a geometric feature or other tactile feedback structure that facilitates the production of the predetermined tactile effect (e.g., by collapsing or otherwise deforming in response to the force input).

Notwithstanding the foregoing similarities, the deformable structure 108 may include support structure 174. The support structure 174 may separate the first and second layers 138, 142. For example, the first layer 138 may be coupled with the support structure 174 at a first surface and the second layer 142 may be coupled with the support structure 174 at a second surface opposite the first surface. In some cases, the first and second layers 138, 142 may be affixed to the support structure 174 via an adhesive. In other cases, the first and second layers 138, 142 may be overmolded to the support structure 174. As another example, the support structure 174 may be integrally formed with first and second layers 138, 142 such that the support structure 174 and the first and second layers 138, 142 may form a unitary component.

The support structure 174 may be configured to maintain the offset 146 that separates the first and second layers 138, 142 at the localized region 148. In the embodiment of FIG. 3G, the offset 146 may be defined by a cavity or void with the support structure 174, such as cavity 178. In one embodiment, the cavity 178 may be substantially enclosed within the deformable structure 108, such that an environment within the cavity 178 may be sealed from an external environment. This may allow the cavity 178 to cushion or dampen the effects of the force input F received at the first layer 138. For example, the force input F may cause a portion of the cavity 178 to collapse, thereby increasing a pressure within the cavity 178. This increased pressure may cushion or dampen the force input F, and may be configured to simulate the tactile sensation of typing on a mechanical keyboard. For example, the cavity 178 may cause the first layer 138 to deform according to a force-displacement curve that at least partially resembles a force-displacement curve of a mechanical keyboard key.

Additionally or alternatively, the cavity 178 may be configured to release a volume of gas or fluid held within the cavity 178 in response to the force input F. As one example, the support structure 174 may include a relieve valve or other mechanism for allowing gases or fluids to exit and enter the cavity 178. In other cases, the cavity 178 may be a component of a hydraulic system in which pressure is dynamically controlled across a group of cavities. To illustrate, the input structure 132 may include a hydraulic system having a fluid reservoir and one or more pumps, heating elements, and/or other elements configured to change the pressure within the hydraulic system. The cavity 178 may be fluidically connected to such hydraulic system, which may dynamically change the pressure within the cavity 178. Among other uses, this may allow a user to customize the cushioning or damping effect of the cavity 178 (e.g., by increasing or decreasing a static pressure of the cavity 178).

Figure 3H:
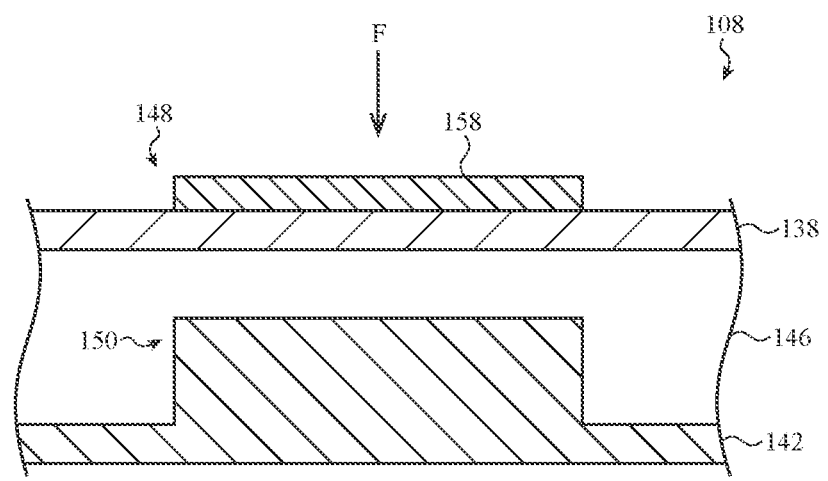
FIG. 3H depicts a cross-sectional view of the deformable structure of FIG. 2, taken along line A-A of FIG. 1, according to another embodiment.

As illustrated in the embodiment of FIG. 3H, the deformable structure 108 includes: first and second layers 138, 142; offset 146; localized region 148; protrusion 150; and keycap 158. The deformable structure 108 may be substantially analogous to the deformable structure 108 described with respect to FIG. 3A. For example, the first and second layers 138, 142 may cooperate to produce a predetermined tactile effect in response to a force input received at the first layer 128. Further, one or both of the first and second layer 138, 142 may include or define a geometric feature or other tactile feedback structure that facilitates the production of the predetermined tactile effect (e.g., by collapsing or otherwise deforming in response to the force input).

Notwithstanding the foregoing similarities, the second layer 142 may define a protrusion 150 that is substantially solid. That is, rather than define a cavity or other recess or opening, the protrusion 150 may be a projection or extension of the second layer 142 that extends toward the first layer 138. As depicted in the embodiment of FIG. 3H, the protrusion 150 may be positioned in substantially aligned with the localized region 148. Additionally, the deformable structure 108 is depicted in FIG. 3B without various optional features, such as the fabric cover 162, and the brace 166.

The geometric features of each of the first and second layers 138, 142 may cooperate to produce a predetermined tactile effect. To illustrate, the force input F may cause the first layer 138 to displace or deform into the offset 146 and toward the second layer 142. In some cases, the first layer 138 may impact the second layer 142 in response to the force input F. In particular, the first layer 138 may deform toward, and subsequently impact, the substantially solid protrusion 150. The substantially solid protrusion 150 may produce a different tactile sensation than the protrusion 150 described with respect to FIG. 3A (which defines the cavity 154). In one instance, the substantially solid protrusion 150 may increase the amount of force required to displace the first layer 138 when the first layer impacts the protrusion 150. It will be appreciated, however, the various properties of the substantially solid protrusion 150 may be altered to produce various tactile effects at the deformable structure 108, including properties such as material density, thickness, size, shape, and so forth. As one example, the density of the substantially solid protrusion 150 may be increased or decreased (e.g., by selecting various different materials) to alter a tactile sensation produced by the deformable structure 108.

Figure 3I:
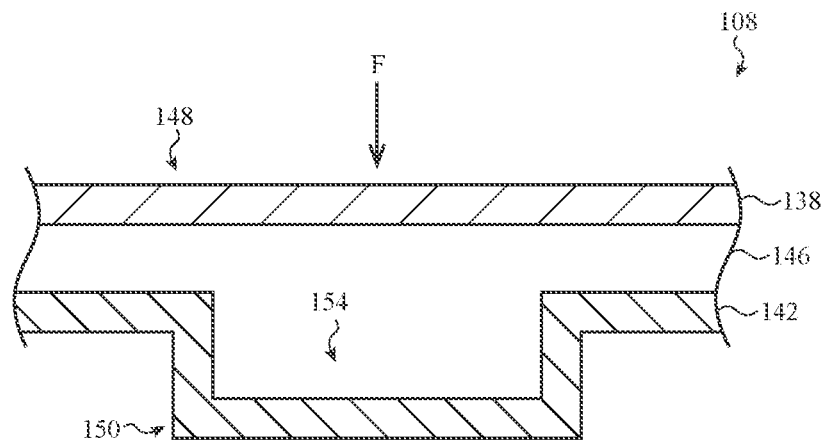
FIG. 3I depicts a cross-sectional view of the deformable structure of FIG. 2, taken along line A-A of FIG. 1, according to another embodiment.

As illustrated in the embodiment of FIG. 3I, the deformable structure 108 includes: first and second layers 138, 142; offset 146; localized region 148; protrusion 150; and cavity 154; and keycap 158. The deformable structure 108 may be substantially analogous to the deformable structure 108 described with respect to FIG. 3A. For example, the first and second layers 138, 142 may cooperate to produce a predetermined tactile effect in response to a force input received at the first layer 128. Further, one or both of the first and second layer 138, 142 may include or define a geometric feature or other tactile feedback structure that facilitates the production of the predetermined tactile effect (e.g., by collapsing or otherwise deforming in response to the force input).

Notwithstanding the foregoing similarities, the second layer 142 defines a protrusion 150 that extends along a direction away from the first layer 138. The protrusion 150 may be substantially hollow and define a cavity 154. The cavity 154 may be integrally connected to the offset 146. As such, a portion of the second layer 142 may be separated from the first layer 138 by both the offset 146 and the cavity 154. For the embodiment of FIG. 3I, this portion of the second layer 142 may define the localized region 148 at which a force input may be received to control a computing device. Additionally, the deformable structure 108 is depicted in FIG. 3I without various optional features, such as the keycap 158, the fabric cover 162, and the brace 166.

In response to the force input F received at the first layer 138, the first layer 138 may deform towards the second layer 142. This may cause the first layer 138 to impact the second layer 142. For example, the first layer 138 may contact an interior surface of the second layer 142. In turn, the protrusion 150 and/or other geometric feature of the second layer 142 may collapse or deform. In one instance, the protrusion 150 may bow such that a portion of the protrusion deforms to extend toward the first layer 138 as the first layer 138 continues to exert force on the second layer 142. Accordingly, the tactile response of the first layer 138 may be at least partially based on the configuration of the protrusion 150.

Figure 3J:
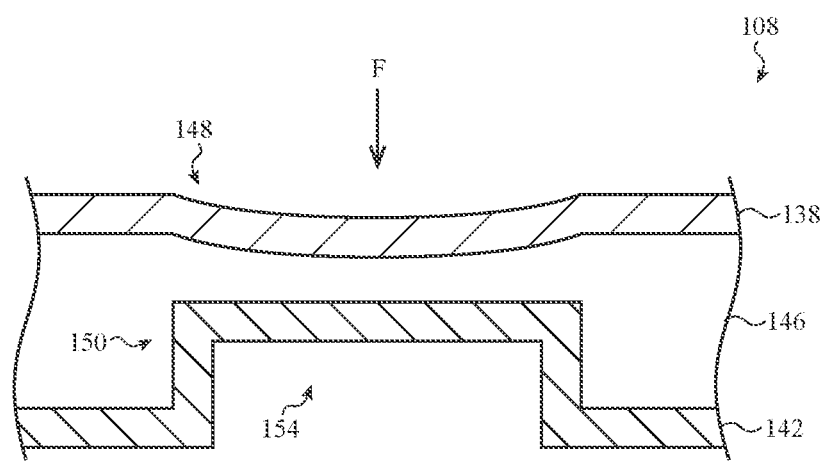
FIG. 3J depicts a cross-sectional view of the deformable structure of FIG. 2, taken along line A-A of FIG. 1, according to another embodiment.

As illustrated in the embodiment of FIG. 3J, the deformable structure 108 includes: first and second layers 138, 142; offset 146; localized region 148; protrusion 150; and cavity 154. The deformable structure 108 may be substantially analogous to the deformable structure 108 described with respect to FIG. 3A. For example, the first and second layers 138, 142 may cooperate to produce a predetermined tactile effect in response to a force input received at the first layer 128. Further, one or both of the first and second layer 138, 142 may include or define a geometric feature or other tactile feedback structure that facilitates the production of the predetermined tactile effect (e.g., by collapsing or otherwise deforming in response to the force input).

Notwithstanding the foregoing similarities, the first layer 138 may define a debossed region 170. The debossed region 170 may be an indent, groove, or other depression formed into a surface of the first layer 138 at or near the localized region 148. In this regard, the debossed region 170 may be a geometric feature that facilitates the tactile sensation of the deformable structure 108, for example, by indicating a boundary of the localized region 148, simulating the feel of a mechanical key, or the like. Accordingly, in the embodiment of FIG. 3J, the deformable structure 108 may include a geometric feature defined by the first layer 138 (e.g., debossed region 170) and a geometric feature defined by the second layer 142 (e.g., protrusion 150). Additionally, the deformable structure 108 is depicted in the FIG. 3J without various optional features, such as the fabric cover 160 and the brace 166.

The geometric features of each of the first and second layers 138, 142 may cooperate to produce a predetermined tactile effect. To illustrate, the force input F may cause the debossed region 170 to deform or displace into the offset 146 and toward the second layer 142. The debossed region 170 may subsequently impact the second layer 142 and cause the protrusion 150 to collapse or bow. In this regard, the deformable structure 108 may produce a tactile sensation at least partially based on the debossed region 170 and its associated properties. It will therefore be appreciated that various properties of the debossed region may be altered to produce various different tactile effects, including properties such as: debossed depth, contour, shape, material, or the like. As one example, the depth of the debossed region 170 may be reduced to alter a tactile sensation produced by the deformable structure 108.

Figure 3K:
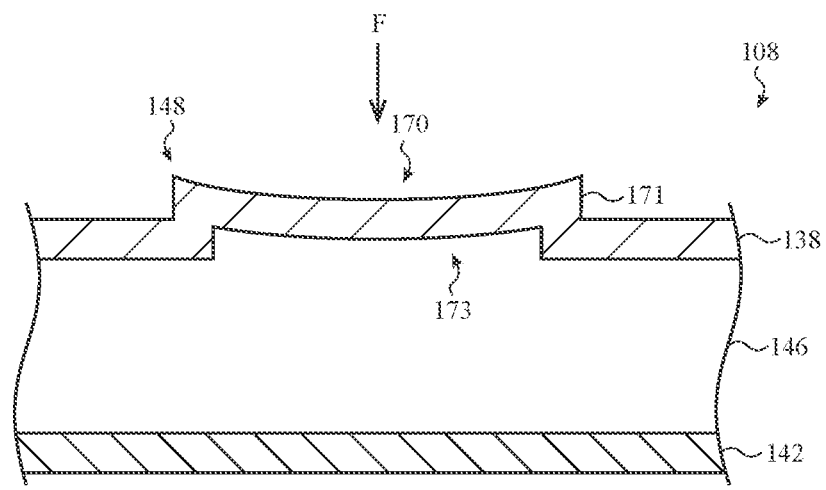
FIG. 3K depicts a cross-sectional view of the deformable structure of FIG. 2, taken along line A-A of FIG. 1, according to another embodiment.

As illustrated in the embodiment of FIG. 3K, the deformable structure 108 includes: first and second layers 138, 142; offset 146; and localized region 148. The deformable structure 108 may be substantially analogous to the deformable structure 108 described with respect to FIG. 3A. For example, the first and second layers 138, 142 may cooperate to produce a predetermined tactile effect in response to a force input received at the first layer 128. Further, one or both of the first and second layer 138, 142 may include or define a geometric feature or other tactile feedback structure that facilitates the production of the predetermined tactile effect (e.g., by collapsing or otherwise deforming in response to the force input).

Notwithstanding the foregoing similarities, the first layer 138 includes a raised portion 171. The raised portion 171 may extend from the first layer 138 along a direction away from the second layer 142. The raised portion 171 may resemble a key board key or other marking indicative of the localized region 148. In this regard, the raised portion 171 may be a geometric feature that facilitates the tactile sensation of the deformable structure 108, for example, by indicating a boundary of the localized region 148. The raised portion 171 may be a substantially hollow protrusion such that it defines a cavity 173 positioned below the first layer 138. The cavity 171 may be integrally connected with the offset 146.

The first layer 138 may also include a debossed region 170 (e.g., substantially analogous to the debossed region 170 described with respect to FIGS. 3C and 3J). The debossed region 170 may be positioned on the first layer 138 at, or within, the raised portion 171. In this regard, the debossed region 171 may be an indent, groove, or other depression formed into the raised portion 171 of the first surface 138. The combination of the debossed region 170 at, or within, the raised portion 171 may resemble a "dragon scale" shape, whereat the peripheries of the localized region 148 are raised and the center of the localized region 148 is recessed or debossed.

Further, the second layer 162 is depicted in FIG. 3K as being substantially planar. In this regard, the deformable structure 108 may operate without various optional features, such as the fabric cover 162, the protrusion 150, the cavity 154, and the brace 166.

The geometric features of each of the first and second layers 138, 142 may cooperate to produce a predetermined tactile effect. To illustrate, the force input F may cause the first layer 138 to displace or deform into the cavity 173 and the offset 146 and toward the second layer 142. In some cases, the first layer 138 may impact the second layer 142 in response to the force input F. More particularly, the force input F may cause the debossed region 170 to deform or displace into the cavity 173 and the offset 146 and toward the second layer 142. In this regard, the tactile sensation produced by the deformable structure 108 may at least partially be based on the inclusion of the raised portion 171 and the debossed region 170 on the deformable structure 108 and the associated properties of each feature. It will therefore be appreciated that various properties of the debossed region may be altered to produce various different tactile effects, including properties such as: debossed depth, contour, shape, material, or the like. As one example, the depth of the debossed region 170 may be reduced to alter a tactile sensation produced by the deformable structure 108.

Figure 3L:
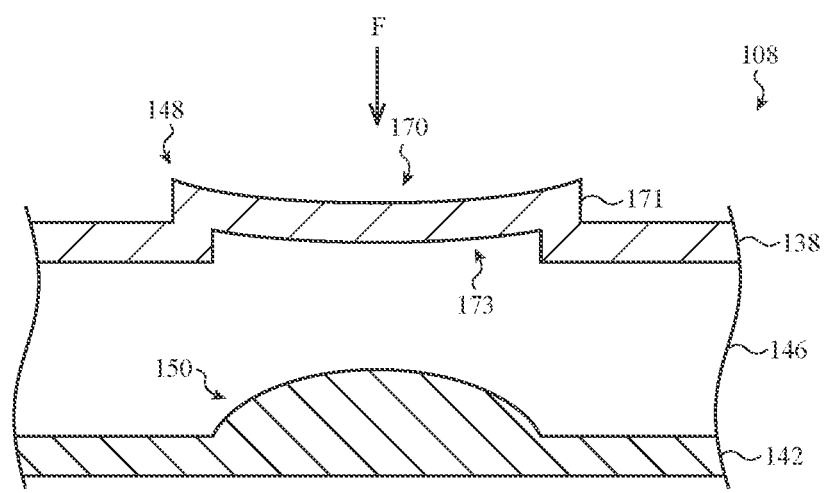
FIG. 3L depicts a cross-sectional view of the deformable structure of FIG. 2, taken along line A-A of FIG. 1, according to another embodiment.

As illustrated in the embodiment of FIG. 3L, the deformable structure 108 includes: first and second layers 138, 142; offset 146; localized region 148; protrusion 150; debossed region 170; and raised portion 171. In this regard, the deformable structure 108 may be substantially analogous to the deformable structure 108 described with respect to FIG. 3K. For example, the first and second layers 138, 142 may cooperate to produce a predetermined tactile effect in response to a force input received at the first layer 128. Further, one or both of the first and second layer 138, 142 may include or define a geometric feature or other tactile feedback structure that facilitates the production of the predetermined tactile effect (e.g., by collapsing or otherwise deforming in response to the force input).

Notwithstanding the foregoing similarities, the second layer 142 may define a protrusion 150. The protrusion 150 may be substantially solid protrusion extending from a surface of the second layer 142 and toward the first layer 138. The protrusion 150 may be positioned on the second layer in substantial alignment with the localized region 148.

The geometric features of each of the first and second layers 138, 142 may cooperate to produce a predetermined tactile effect. To illustrate, the force input F may cause the first layer 138 to displace or deform into the offset 146 and toward the second layer 142. In some cases, the first layer 138 may impact the second layer 142 in response to the force input F. More particularly, the force input F may cause the debossed region 170 to deform or displace into the cavity 173 and the offset 146 and toward the second layer 142. In this regard, the debossed region 170 may impact the protrusion 150. This may cause the deformable structure 108 to produce a tactile sensation at least partially based on the protrusion 150 and its associated properties. For example, and as generally described with respect to FIG. 3H, various properties of the substantially solid protrusion 150 may be altered to produce various different tactile effects at the deformable structure 108, including properties such as material density, thickness, size, shape, and so forth. As one example, as shown in FIG. 3L, the protrusion 150 may have substantially rounded edges. In other cases, the edges of the protrusion may be raised, angles, chamfered, or otherwise shape so as to produce a desired tactile effect.

Figure 3M:
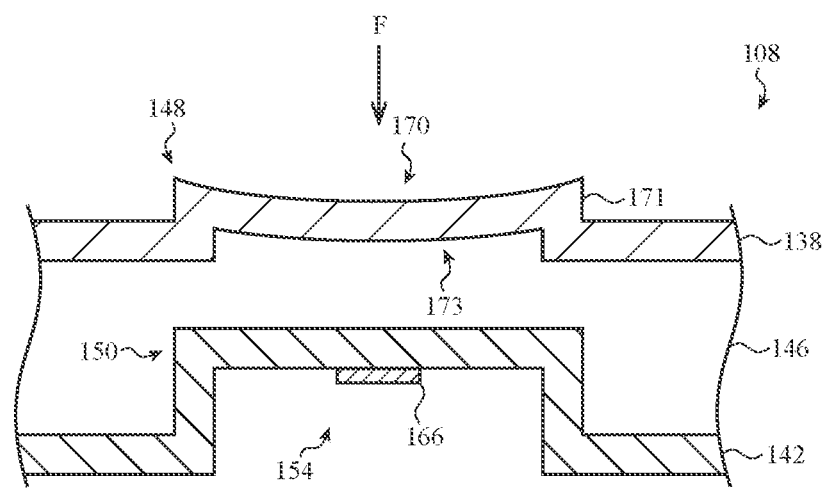
FIG. 3M depicts a cross-sectional view of the deformable structure of FIG. 2, taken along line A-A of FIG. 1, according to another embodiment.

As illustrated in the embodiment of FIG. 3M, the deformable structure 108 includes: first and second layers 138, 142; offset 146; localized region 148; protrusion 150; debossed region 170; and raised portion 171. The deformable structure 108 may be substantially analogous to the deformable structure 108 described with respect to FIG. 3K. For example, the first and second layers 138, 142 may cooperate to produce a predetermined tactile effect in response to a force input received at the first layer 128. Further, one or both of the first and second layer 138, 142 may include or define a geometric feature or other tactile feedback structure that facilitates the production of the predetermined tactile effect (e.g., by collapsing or otherwise deforming in response to the force input).

Notwithstanding the foregoing similarities, the second layer 142 may define a protrusion 150. The protrusion 150 may be substantially hollow and define a cavity 154 positioned below the second layer 142. The protrusion 150 may be positioned on the second layer in substantial alignment with the localized region 148. Further, the deformable structure may include a brace 166 positioned on the second layer 142 within the cavity 154.

The geometric features of each of the first and second layers 138, 142 may cooperate to produce a predetermined tactile effect. To illustrate, the force input F may cause the first layer 138 to displace or deform into the offset 146 and toward the second layer 142. In some cases, the first layer 138 may impact the second layer 142 in response to the force input F. More particularly, the force input F may cause the debossed region 170 to deform or displace into the cavity 173 and the offset 146 and toward the second layer 142. In this regard, the debossed region 170 may impact the protrusion 150. Upon impact, the protrusion 150 may bow, bend, or collapse into the cavity 154. The brace 166 may concentrate forces or stresses generated with the second layer 142 during such impact.

In this regard, the deformable structure 108 may produce a tactile sensation at least partially based on the protrusion 150 and its associated properties. For example, and as generally described with respect to FIG. 3D, various properties of the protrusion 150 and the cavity 154 may altered to produce various different tactile effect, including properties such as: shape, texture, size, and thickness. As one example, the thickness of the second layer 142 may be increased at the protrusion 150 to stiffen the second layer 142. This may alter the force required to displace the first layer 138 upon impacting the protrusion 150 in order to produce a particular tactile effect.

Figure 4A:
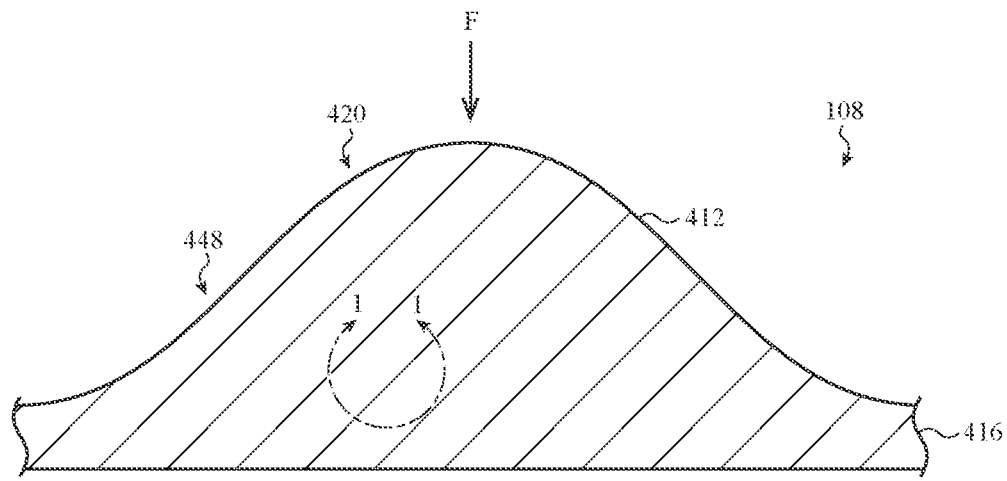
FIG. 4A depicts a cross-sectional view of the deformable structure of FIG. 2, taken along line A-A of FIG. 1, according to another embodiment.

FIG. 4A is a cross-sectional view of the deformable structure 108 of FIG. 2, taken along line A-A of FIG. 1. In particular, FIG. 4A presents a cross-sectional view of an alternative embodiment of the deformable structure 108 as described above with respect to FIG. 3A. Broadly, the deformable structure 108 may be substantially analogous to the deformable structure 108 described with respect to FIG. 3A. For example, the deformable structure 108 may include various layers that cooperate to produce a predetermined tactile effect in response to a force input. Further, the layers of the deformable structure 108 may include or define various geometric features or other tactile feedback structures that produce a predetermined tactile effect (e.g., by collapsing or otherwise deforming in response to the force input).

Notwithstanding the foregoing, the deformable structure 108 may be a substantially solid component. The solid component may include multiple layers of materials or substrates affixed to one another. The combination of the multiple layers of material may be configured to produce a predetermined tactile effect in response to a force input F. For example, the shape, size, material, orientation, or the like of the layers may be selected such that the deformable structure 108 simulates the sensation of typing on a mechanical keyboard key.

As shown in FIG. 4A, the deformable structure 108 may include input surface 412. The input surface 412 may be positioned over (or may be a surface of) one or more reinforcement components positioned below the input surface 412. For example, input surface 412 may be positioned over reinforcement component 416. Broadly, the reinforcement component 416 may be configured to collapse, deflect, or otherwise deform in response to a force input received at the input surface 412. In this manner, the tactile response of the input surface 412 may be at least partially based on the particular structures, material properties, or the like of the reinforcement component 416. In this manner, the reinforcement component 416 may include or define a tactile feedback structure or other geometric feature that is configured to produce a predetermined tactile response at the input surface in response to the force input F.

In one embodiment, as depicted in FIG. 4A, the reinforcement component 416 may define a bulbous region 420. The bulbous region 420 may be a tactile feedback structure that provides a predetermined tactile effect. For example, the bulbous region 420 may provide a predetermined tactile effect when the input layer 412 deforms the reinforcement component 416 in response to the force input F.

The bulbous region 420 may be a raised portion of the deformable structure 108. The bulbous portion 420 may define or be substantially aligned with a localized region 448 of the deformable structure 108. The localized region 448 may be substantially analogous to the localized region 148 described with respect to FIGS. 3A-3D. For example, the localized region 448 may be configured to receive the force input F for use in controlling a function of a computing device. In this manner, the bulbous portion 420 may allow a user to tactilely and visually distinguish the location of the localized region 448. This may increase the accuracy and precision with which a user may use the deformable structure 108 to control a computing device.

Analogous to the deformable structure 108 described with respect to FIGS. 3A-3D, the deformable structure 108 of FIG. 4A may be coupled with the illumination layer 124, haptic feedback structure 128, and/or input structure 132 (e.g., as described with respect to FIG. 2). In this regard, the input structure 132 may be configured to detect a magnitude of the force input F exerted on the input layer 412. When the magnitude exceeds a threshold, the input structure 132 may be configured to generate a user input signal for use in controlling a computing device. Additionally or alternatively, the haptic feedback structure 128 may be configured to generate a vibrotactile effect, audial effect, and/or other haptic effect when the magnitude of the force input F exceeds the threshold value. In some cases, the threshold used to generate the user input signal may be a different value than the threshold used to generate the haptic feedback.

In one embodiment, reinforcement component 416 may include a set of layers. The set of layers may be shaped to define the bulbous region 420 of the reinforcement component 416. In other cases, the set of layers may be shaped to form other geometries. In this regard, the set of layers may be constructed from any appropriate material to produce a desired tactile sensation at the input surface 412. For example, and as described in greater detail with respect to FIG. 2, the set of layers may be sufficiently elastic and resilient such that the bulbous region 420 elastically deforms from applied force. The set of layer may also, collectively, be sufficiently stiff such that the force required to displace the input surface 412 that localized region 448 increases as the displacement increases.

Figure 4B:
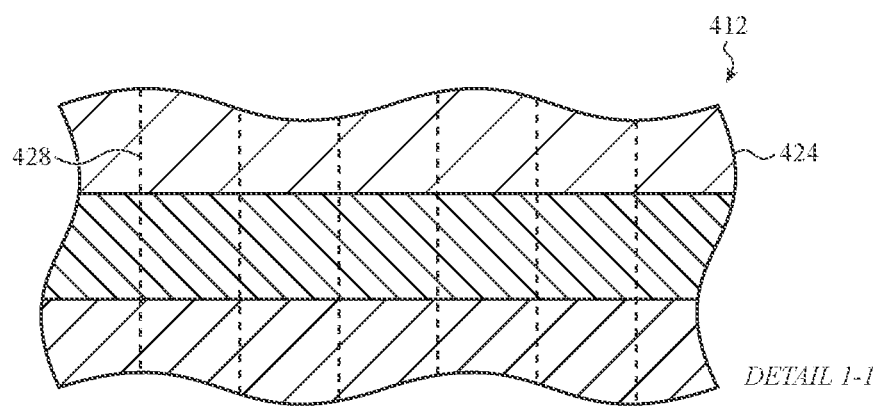
FIG. 4B depicts an enlarged view of a portion of the deformable structure of FIG. 4A, according to further embodiments.

FIG. 4B depicts detail 1-1 of FIG. 4A of the reinforcement component 416. The reinforcement component 416 may include a set of layers 424. In one embodiment, each layer of the set of layers 424 may be constructed from the same material. In other cases, various ones of the set of layers 424 may be constructed from different materials. This may allow the set of layers 424 to produce a particular tactile sensation. For example, one or more of the set of layers 424 may have an increased stiffness to reinforce a portion of the bulbous region 420. Additionally or alternatively, one or more of the set of layers 424 may include or define a void or hollow portion within the bulbous region 420. In some cases, such voids may be microperforations that are not visually perceptible. Such features may allow the bulbous region 420 to cushion or dampen the stresses caused by the force input F.

The set of layers 424 may be affixed to one another to resist delamination in response to a force, such as an input force, shear force, or the like. As shown in FIG. 4B, various adjacent layers 422, 424, 426 may be affixed to one another via fibers 428. The fibers 428 may extend partially or fully through various layers, and may extend between non-adjacent layers (e.g., layers 422 and 426, or the like). In this manner, the fibers 428 may bond together multiple layers, which may permit the layers to respond as a unitary body to an exterior force. Further, the fibers may enhance the strength and durability of the bulbous portion 420. Put another way, the fibers may prevent shear or slipping between adjacent layers 422, 424, 426, thereby reducing the wear experienced by the layers in response to a deforming force. In some embodiments, the fibers 428 may be tailored to provide localized resistance to force, stress, shear, and the like in certain regions, while other regions have varying resistance(s).

As another example, the offset between the fibers 428 may be increased or decreased to alter the strength of the connection between an adjacent one of the set of layer 424. It will be appreciated that the fibers 428 are presented for purposes of illustration. In some cases, the set of layers 424 may be affixed via other techniques, including using adhesives, mechanical fasteners, or the like.

Figure 5:
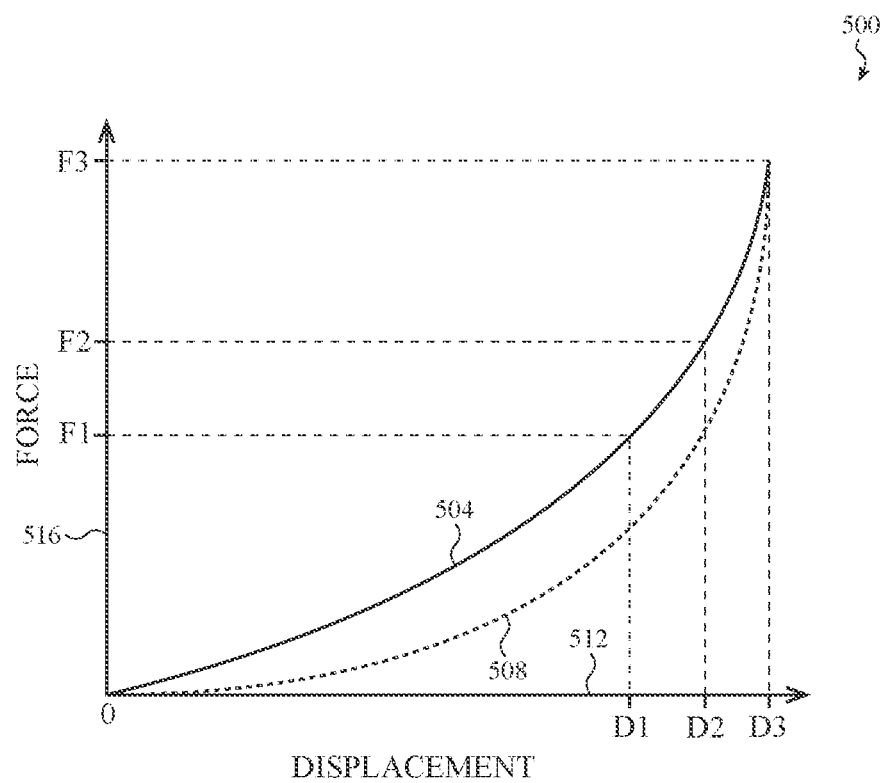
FIG. 5 depicts a sample force-displacement curve for the deformable structure of FIG. 2.

FIG. 5 shows a force-displacement diagram 500. The force-displacement diagram 500 depicts a sample force required to displace a portion of a deformable structure, such as any of the deformable structures described with respect to FIGS. 1-4B. In particular and with reference to FIG. 3A, diagram 500 depicts a curve 504 that represents the forced required to displace the first layer 138 of the deformable structure 108 at the localized region 148.

The diagram 500 includes a displacement axis 512 and a force axis 516. The displacement axis 512 represents a perpendicular displacement of the first layer 138 at the localized region 148 (e.g., such as the displacement caused by the force input F). Increasing values along the displacement axis 512 may indicate translation of the first layer 138 from a neutral or undeformed position. The force axis 516 may represent a force required to displace the first layer 138 to a respective position represented on the displacement axis 512.

As shown in FIG. 5, the force required to displace the first layer 138 at the localized region 148 may increase. For example, the force required to displace the first layer 138 at the localized region 148 may increase as the displacement increases. This is shown in FIG. 5, where at the first layer 138 may be displaced to first deflection point D1 upon the application of a first force F1; the first layer 138 may be displaced to second deflection point D2 upon the application of a second force F2; and the first layer 138 may be displaced to third deflection point D3 upon the application of a third force F3. This increase in force may at least partially be due to the physical attributes of the deformable structure 108. For example, the geometric features and other components of the deformable structure 108 (described with respect to FIGS. 3A-3D) may cause the first layer 138 to operate according to the curve 504.

In the embodiment of FIG. 5, the curve 504 may represent the deformable structure 108 described with respect to FIG. 3A, which includes the first and second layers 138, 142, the offset 146, and the protrusion 150. Characteristics of the deformable structure 108 may be altered or modified such that the deformable structure 108 operates according to a different force displacement curve, for example, such that the deformable structure 108 exhibits a different tactile response. This is illustrated in diagram 500 by curve 508 (depicted by a phantom line in FIG. 5), which may represent the force required to displace a deformable structure 108 having different geometries and/or configurations than that of the deformable structure 108 described with respect to FIG. 3A. As shown, the curve 508 may initially be displaced using a lesser amount of force than that required to displace the deformable structure 108 of the curve 504. The tactile feedback of the deformable structure 108 may at least partially depend on the relationship expressed by the force-displacement curve. As such, it will be appreciated that the force-displacement curve of a deformable structure 108 may be modifiable based on the geometric features or the like of the deformable structure 108 to provide a predetermined tactile response.

As described with respect to FIG. 2, the input device 104 may be configured to generate an electrical response or a user input signal in response to the force input F exceeding a threshold. The threshold may be predetermined and/or dynamically variable. Accordingly, the threshold may be substantially any value along the curve 504. A user may therefore customize the threshold such that the user input device generates a user input signal when the first layer 138 (or other portion of the deformable structure 108) deforms or displaces to a particular value. To illustrate, a user that prefers a keyboard with a higher sensitivity may customize the user input device 104 such that it generates a user input signal when the force input exceeds the first force F1 (corresponding to first deflection point D1). Alternatively, a user that prefers a keyboard with a lower sensitivity may customize the user input device 104 such that is generates a user input signal when the force input exceeds the third force F3 (corresponding to the third deflection point D3). In some cases, a user may define multiple thresholds such that multiple functions may be performed by displacing the first layer 138 at the localized region 148 to varying degrees. As one example, the user input device 104 may generate a first user input signal corresponding to a first function when the first layer is displaced to the first deflection point D1 and generate a second user input signal corresponding to a second function when the second layer is displaced to the second deflection point D2.

The user input device 104 may also generate haptic feedback using the threshold value. For example, and as described in greater detail above with respect to FIG. 2, the haptic feedback structure 128 may generate haptic feedback when the force input F exceeds the threshold. In this regard, the haptic feedback structure 128 may generate haptic feedback when the force input equals the first force F1, second force F2, third force F3, or substantially any other force along the curve 504. And analogous to the input structure 132, the threshold may be customized such that the haptic feedback is generated when the first layer 138 (or other portion of the deformable structure 108) deforms or displaces to a particular value. In some cases, a user may define multiple thresholds such that multiple haptic effects may be performed by displacing the first layer 138 at the localized region 148 to varying degrees. As one example, the haptic feedback structure 128 may generate a first haptic effect when the first layer 138 is displaced to the first deflection point D1 and generate a second haptic effect when the first layer 138 is displaced to the second deflection point D2.

The haptic effects may enhance the tactile sensation of the deformable structure. For example, the sequence of haptic effects described above may cause a user to experience sensations similar to that of typing on a mechanical keyboard key. In a particular embodiment, one or more of the haptic effects may be a vibrotactile effect that simulates the sensation of a collapsing mechanical dome used in a mechanically actuated keyboard.

In some cases, the input structure 132 may use a first threshold for generating a user input signal and the haptic feedback structure 128 may use a second, different threshold for generating one or more haptic effects. This may allow the haptic feedback structure 128 to generate haptic effects that do not necessarily correspond with the generation of a user input signal. This may be desirable in order to simulate the tactile effect of typing on a keyboard prior to the input structure 132 generating a user input signal. As one example, the haptic feedback structure 128 may generate a first haptic effect when the first layer 138 is displaced to D1 (corresponding to first force F1) and generate a second haptic effect when the first layer 138 is displaced to D2 (corresponding to second force F2). When the first layer 138 is displaced to D2, the input structure 132 may generate a user input signal. In this regard, unlike a mechanically actuated keyboard, the haptic effects of the input device 104 need not be based on the generation of a user input signal. Rather, the haptic effects and user input signal may be generated independently of one another. This may allow a user to customize the user input device 104 according to various preferences.

Figure 6:
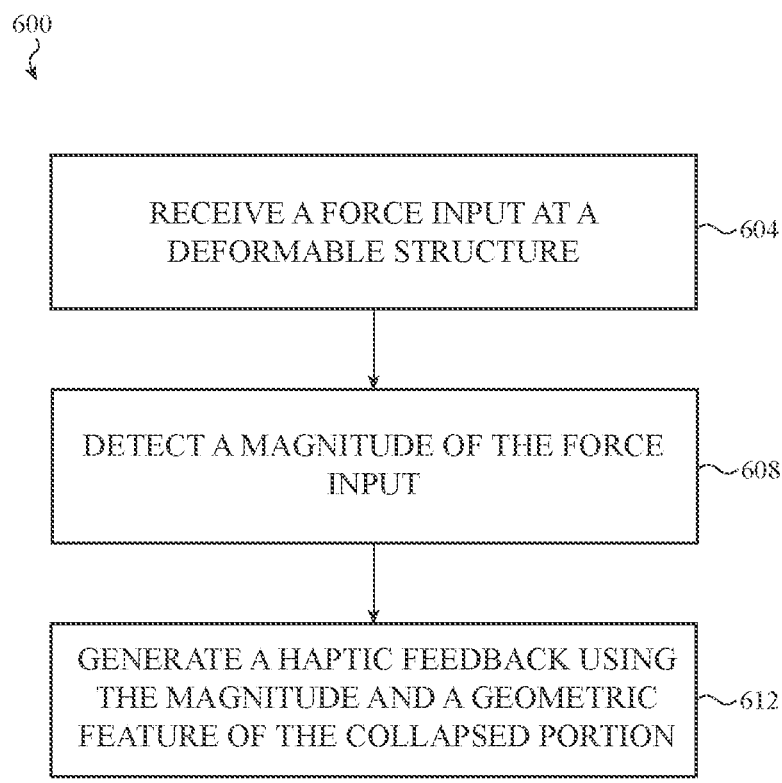
FIG. 6 is a flow diagram of a method for operating a keyboard.

To facilitate the reader's understanding of the various functionalities of the embodiments discussed herein, reference is now made to the flow diagram in FIG. 6, which illustrates process 600. While specific steps (and orders of steps) of the methods presented herein have been illustrated and will be discussed, other methods (including more, fewer, or different steps than those illustrated) consistent with the teachings presented herein are also envisioned and encompassed with the present disclosure.

In this regard, with reference to FIG. 6, process 600 relates generally to operating an input device. The process 600 may be used in conjuction with the input devices described herein (e.g., input device 104 described with respect to FIGS. 1-5). In particular, a processing unit of the electronic device may be configured to perform one or more of the example operations described below.

At operation 604, a deformable structure may receive a force input. The force input may cause a portion of the deformable structure to collapse. For example and with reference to FIG. 3A, the deformable structure 108 may receive the force input F at the localized region 148. The localized region 148 may be defined by a portion of the first layer 138. In response to the force input, the first layer 138 may deform at the localized region 148. For example, the first layer 138 may deform towards the second layer 142. This may cause the first layer 138 to impact the second layer 142 and subsequently collapse a portion of the deformable structure 108.

At operation 608, an input structure connected operatively to the deformable structure may detect a magnitude of the force input. For example and with reference to FIGS. 2 and 3A, the input structure 132 may be coupled with the deformable structure 108 and configured to detect a magnitude of the force input F received at the first layer 138. In one embodiment, the input structure 132 may be a capacitance-based force sensor that correlates a change in capacitance (e.g., as measured at the input structure 132) with a magnitude of the force input F.

At operation 612, a haptic feedback structure connected operatively to the deformable structure may generate haptic feedback using the magnitude of the force input and a geometric feature of the collapsed portion. For example and with reference to FIGS. 2 and 3A, the haptic feedback structure 128 may be coupled with the deformable structure 108 and configured to generate haptic feedback. In particular, the haptic feedback structure 128 may be configured to use the magnitude of the force input and a geometric feature of the deformable structure 108 to generate the haptic feedback. With respect to the embodiment of FIG. 3A, the geometric feature may be the protrusion 150. Accordingly, the force input F received at the first layer 138 may cause the protrusion to collapse. This may generate haptic feedback that simulates a tactile sensation of typing on a keyboard. Additionally, the haptic feedback structure may generate other haptic effects (e.g., including vibrotactile effects, audial effects, or the like) to enhance this sensation using the magnitude of the force input F.

Figure 7:
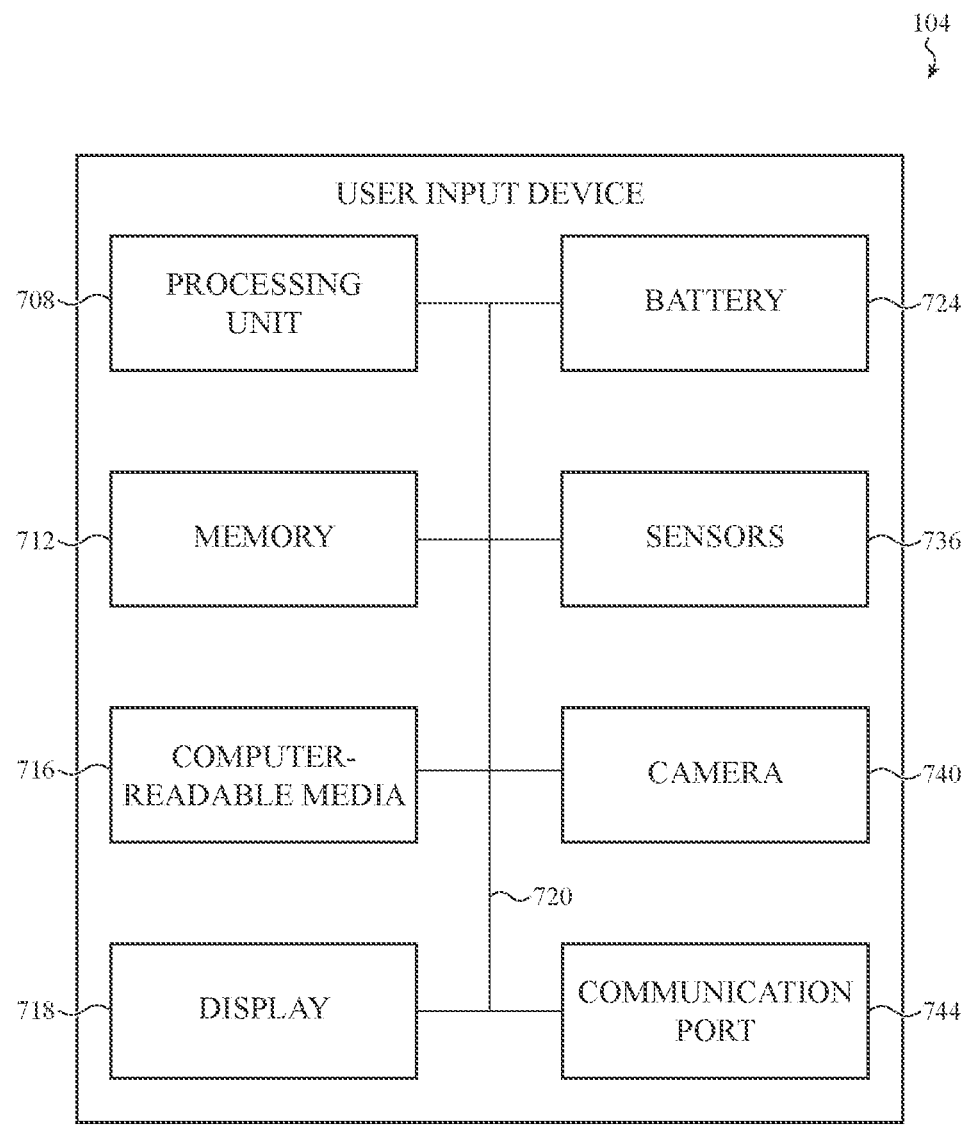
FIG. 7 illustrates an embodiment of a functional block diagram of a user input device.

FIG. 7 presents a functional block diagram of user input device 104. In this regard, the schematic representation in FIG. 7 may correspond to the user input device 104 depicted in FIGS. 1-6, described above. The user input device 104 may include any appropriate hardware (e.g., computing devices, data centers, switches), software (e.g., applications, system programs, engines), network components (e.g., communication paths, interfaces, routers) and the like (not necessarily shown in the interest of clarity) for use in facilitating any appropriate operations disclosed herein.

As shown in FIG. 7, the user input device 104 may include a processing unit 708 operatively connected to computer memory 712 and computer-readable media 716. The processing unit 708 may be operatively connected to the memory 712 and computer-readable media 716 components via an electronic bus or bridge (e.g., such as system bus 720). The processing unit 708 may include one or more computer processors or microcontrollers that are configured to perform operations in response to computer-readable instructions. The processing unit 708 may include the central processing unit (CPU) of the device. Additionally or alternatively, the processing unit 708 may include other processors within the device including application specific integrated chips (ASIC) and other microcontroller devices.

The memory 712 may include a variety of types of non-transitory computer-readable storage media, including, for example, read access memory (RAM), read-only memory (ROM), erasable programmable memory (e.g., EPROM and EEPROM), or flash memory. The memory 712 is configured to store computer-readable instructions, sensor values, and other persistent software elements. Computer-readable media 716 may also include a variety of types of non-transitory computer-readable storage media including, for example, a hard-drive storage device, a solid state storage device, a portable magnetic storage device, or other similar device. The computer-readable media 716 may also be configured to store computer-readable instructions, sensor values, and other persistent software elements.

In this example, the processing unit 708 is operable to read computer-readable instructions stored on the memory 712 and/or computer-readable media 716. The computer-readable instructions may adapt the processing unit 708 to perform the operations or functions described above with respect to FIGS. 1-6. The computer-readable instructions may be provided as a computer-program product, software application, or the like.

As shown in FIG. 7, the user input device 104 may also include a display 718. The display 718 may include a liquid-crystal display (LCD), organic light emitting diode (OLED) display, light emitting diode (LED) display, or the like. If the display 718 is an LCD, the display may also include a backlight component that can be controlled to provide variable levels of display brightness. If the display 718 is an OLED or LED type display, the brightness of the display 718 may be controlled by modifying the electrical signals that are provided to display elements. In one embodiment, the display 718 may include (or be coupled with) illumination layer 124 described in relation to FIG. 2.

The user input device 104 may also include a battery 724 that is configured to provide electrical power to the components of the user input device 104. The battery 724 may include one or more power storage cells that are linked together to provide an internal supply of electrical power. The battery 724 may be operatively coupled to power management circuitry that is configured to provide appropriate voltage and power levels for individual components or groups of components within the user input device 104. The battery 724, via power management circuitry, may be configured to receive power from an external source, such as an AC power outlet or interconnected computing device. The battery 724 may store received power so that the user input device 104 may operate without connection to an external power source for an extended period of time, which may range from several hours to several days.

The user input device 104 may also include one or more sensors 736 that may be used to detect a touch and/or force input, environmental condition, orientation, position, or some other aspect of the user input device 104. Example sensors 736 that may be included in the user input device 104 may include, without limitation, one or more accelerometers, gyrometers, inclinometers, goniometers, or magnetometers. The sensors 736 may also include one or more proximity sensors, such as a magnetic hall-effect sensor, inductive sensor, capacitive sensor, continuity sensor, or the like. In one embodiment, the sensors 736 may include or be components of the input structure 132 described with respect to FIG. 2.

The sensors 736 may also be broadly defined to include wireless positioning devices including, without limitation, global positioning system (GPS) circuitry, Wi-Fi circuitry, cellular communication circuitry, and the like. The user input device 104 may also include one or more optical sensors including, without limitation, photodetectors, photosensors, image sensors, infrared sensors, or the like. In one example, the sensor 736 may be an image sensor that detects a degree to which an ambient image matches a stored image. As such, the sensor 736 may be used to identify a user of the user input device 104. The sensors 736 may also include one or more acoustic elements, such as a microphone used alone or in combination with a speaker element. The sensors 736 may also include a temperature sensor, barometer, pressure sensor, altimeter, moisture sensor or other similar environmental sensor. The sensors 736 may also include a light sensor that detects an ambient light condition of the user input device 104.

The sensors 736, either alone or in combination, may generally be a motion sensor that is configured to determine an orientation, position, and/or movement of the user input device 104. For example, the sensor 736 may include one or more motion sensors including, for example, one or more accelerometers, gyrometers, magnetometers, optical sensors, or the like to detect motion. The sensors 736 may also be configured to determine one or more environmental conditions, such as temperature, air pressure, humidity, and so on. The sensors 736, either alone or in combination with other input, may be configured to estimate a property of a supporting surface including, without limitation, a material property, surface property, friction property, or the like.

The user input device 104 may also include a camera 740 that is configured to capture a digital image or other optical data. The camera 740 may include a charge-coupled device, complementary metal oxide (CMOS) device, or other device configured to convert light into electrical signals. The camera 740 may also include one or more light sources, such as a strobe, flash, or other light-emitting device. As discussed above, the camera 740 may be generally categorized as a sensor for detecting optical conditions and/or objects in the proximity of the user input device 104. However, the camera 740 may also be used to create photorealistic images that may be stored in an electronic format, such as JPG, GIF, TIFF, PNG, raw image file, or other similar file types.

The user input device 104 may also include a communication port 744 that is configured to transmit and/or receive signals or electrical communication from an external or separate device. The communication port 744 may be configured to couple to an external device via a cable, adaptor, or other type of electrical connector. In some embodiments, the communication port 744 may be used to couple the user input device 104 with a computing device and/or other appropriate accessories configured to send and/or receive electrical signals. The communication port 744 may be configured to receive identifying information from an external accessory, which may be used to determine a mounting or support configuration. For example, the communication port 744 may be used to determine that the user input device 104 is coupled to a mounting accessory, such as a particular type of stand or support structure.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A user input device, comprising:
   a deformable structure, comprising:
   a first layer;
   a set of keycaps attached to the first layer, each of the keycaps defining an input surface;
   and
   a second layer separated from the first layer by a set of gaps at localized regions;
   wherein at least one of the first layer or the second layer defines a set of geometric features, each geometric feature comprising a protrusion extending from the at least one of the first layer or the second layer, each geometric feature being configured to deform along an associated localized region of the localized regions in response to a force input; and
   an input structure comprising a force sensor, wherein the force sensor is configured to produce an electrical response based on a magnitude of the force input.

2. The user input device of claim 1, wherein:
   the user input device further comprises an electronic device casing, the electronic device casing comprising a top surface with an aperture extending therethrough;
   the deformable structure is removeably coupled with the electronic device casing at the aperture; and
   a stiffness of the localized region differs from a stiffness of the deformable structure surrounding the localized region.

3. The user input device of claim 2, wherein each geometric feature produces a tactile sensation indicative of a keyboard key at the localized region when the force input is received at the deformable structure.

4. The user input device of claim 2, wherein:
   the first layer comprises a series of ridges resembling keyboard keys in one of a first configuration or a second configuration;
   the user input device further comprises an illumination layer positioned within the electronic device casing; and
   when the deformable structure is coupled with the electronic device casing, the illumination layer is configured to:
   illuminate a first set of symbols at the first layer when the ridges correspond to the first configuration; and
   illuminate a second set of symbols at the second layer when the ridges correspond to the second configuration.

5. The user input device of claim 1, wherein:
   the set of geometric features comprises a first geometric feature defined by the first layer;
   the set of geometric features further comprises a second geometric feature defined by the second layer; and
   the first and the second geometric features cooperate to collapse the deformable structure at the localized region.

6. The user input device of claim 1, wherein the protrusion is substantially defined by one of: a square shape; a circular shape; or a non-symmetrical shape.

7. The user input device of claim 1, wherein the protrusion comprises a substantially hollow region.

8. The user input device of claim 7, wherein the protrusion comprises a force-concentrating nub positioned within the substantially hollow region.

9. The user input device of claim 1, wherein the protrusion defines a chamfer.

10. The user input device of claim 1, wherein each geometric feature is a debossed region of the at least one of the first layer or the second layer.

11. A method of operating an input device, comprising:
receiving a force input at a deformable structure having a set of keycaps, a first layer, and a second layer, the set of keycaps being attached to the first layer, each keycap being rigid relative to the first layer, the first and second layers being separated by a set of gaps, the force input causing deformation of a geometric feature defined by at least one of the first layer or the second layer;
detecting a magnitude of the force input; and
in response to the magnitude being greater than a threshold, producing a vibrotactile effect at the geometric feature.

12. The method of claim 11, wherein the threshold is dynamically variable.

13. The method of claim 11, wherein the geometric feature is operative to control the deformable structure to operate according to a predefined force-displacement curve.

14. The method of claim 11, wherein the geometric feature comprises at least one of a height dimension or a width dimension of a cavity encompassed within the deformable structure.

15. The method of claim 11, wherein:
detecting the magnitude comprises:
measuring a capacitance at an input structure coupled with the deformable structure; and
a magnitude of the capacitance corresponds to the magnitude of the force input received at the deformable structure.

16. A user input device, comprising:
an input layer including a set of keycaps attached to a relatively flexible structure, each keycap being configured to receive a press input;
a reinforcement layer positioned below the input layer, the reinforcement layer defining a set of geometric features separated from the input layer by a gap; and
an input structure having a force sensor positioned below the input layer and configured to detect a force from the press input, wherein:
the input layer is configured to deform a geometric feature of the set of geometric features of the reinforcement layer in response to the force.

17. The user input device of claim 16, further comprising:
a support structure configured to support the input layer above the reinforcement layer.

18. The user input device of claim 16, further comprising:
a biasing mechanism configured to magnetically impede deformation of the reinforcement layer when the input layer impacts the reinforcement layer.

19. The user input device of claim 16, wherein the reinforcement layer comprises a set of layers affixed together via an array of perpendicularly offset fibers.

20. The user input device of claim 19, wherein the notched portion defines a bulbous portion of the reinforcement layer.

21. The user input device of claim 16, wherein:
press input comprises a gesture performed on the input layer; and
the input structure is configured to detect a characteristic of the gesture based on the change in capacitance.

* * * * *